US009578892B2

(12) United States Patent
Hill

(10) Patent No.: US 9,578,892 B2
(45) Date of Patent: Feb. 28, 2017

(54) PROTEIN RESTRICTION FOR DISEASE PREVENTION AND TREATMENT

(76) Inventor: James W. Hill, Mission Viejo, CA (US)

( * ) Notice: Subject to any disclaimer, the term of this patent is extended or adjusted under 35 U.S.C. 154(b) by 537 days.

(21) Appl. No.: 13/604,535

(22) Filed: Sep. 5, 2012

(65) Prior Publication Data

US 2013/0171292 A1 Jul. 4, 2013

Related U.S. Application Data

(60) Provisional application No. 61/534,344, filed on Sep. 13, 2011, provisional application No. 61/621,959, filed on Apr. 9, 2012, provisional application No. 61/671,591, filed on Jul. 13, 2012, provisional application No. 61/679,782, filed on Aug. 6, 2012.

(51) Int. Cl.
*A23L 1/29* (2006.01)

(52) U.S. Cl.
CPC ............... *A23L 1/293* (2013.01); *A23L 33/30* (2016.08)

(58) Field of Classification Search
CPC .................................. A23L 1/293; A23L 33/00
USPC ....................... 426/2; 514/561, 728; 424/601
See application file for complete search history.

(56) References Cited

U.S. PATENT DOCUMENTS 4,724,234 A * 2/1988 Cone, Jr. ........................ 514/728
5,587,399 A * 12/1996 Acosta et al. ................. 514/561

OTHER PUBLICATIONS

Alirezaei et al., "Short-term Fasting Induces Profound Neuronal Autophagy," Autophagy, 6:6, Aug. 16, 2010, 702-710.
Archer, "Does Dietary Sugar and Fat Influence Longevity?" Medical Hypotheses,60(6), 2003, 924-929.
Ayala et al., "Dietary Protein Restriction Decreases Oxidative Protein Damage, Peroxidizability Index, and Mitochondrial Complex I Content in Rat Liver," Journal of Gerontology: Biological Sciences, vol. 62A, No. 4, 2007, 352-360.
Barrows et al., "Protein Synthesis, Development, Growth and Life Span," Growth, 39, 1975, 525-533.
Bishop et al., "Neural Mechanisms of Ageing and Cognitive Decline," Nature, vol. 464, Mar. 25, 2010, 529-535.
Blander et al., "Amino Acid Addiction," Science, vol. 324, 2009, 1282-1283.
Broughton et al., "Insulin/IGF-like Signalling, the Central Nervous System and Aging," Biochem. J., 418, 2009, 1-12.
Caro et al., "Effect of 40% Restriction of Dietary Amino Acids (except methionine) on Mitochondrial Oxidative Stress and Biogenesis, AIF and SIRT1 in Rat Liver," Biogerontology, 10, 2009, 579-592.
Caro et al., "Forty Percent and Eighty Percent Methionine Restriction Decrease Mitochondrial ROS Generation and Oxidative Stress in Rat Liver," Biogerontology, 9, 2008, 183-196.
Caro et al., "Forty Percent Methionine Restriction Decreases Mitochondrial Oxygen Radical Production and Leak at Complex I During Forward Electron Flow and Lowers Oxidative Damage to Proteins and Mitochondrial DNA in Rat Kidney and Brain Mitochondria," Rejuvenation Research, vol. 12, No. 6, 2009, 421-435.
Chu, "Autophagic Stress in Neuronal Injury and Disease," J Neuropathol Exp Neurol, vol. 65, No. 5, May 2006, 423-432.
Cuervo, "Autophagy in neurons: it is not all about food," Trends in Molecular Medicine, vol. 12, No. 10, Aug. 22, 2006, 461-464.
Davis et al., "Differential Effects of Dietary Caloric and Protein Restriction in the Aging Rat," Experimental Gerontology, vol. 18, 1983, 427-435.
De et al., "Some Biochemical Parameters of Ageing in Relation to Dietary Protein," Mechanisms of Ageing and Development, 21, 1983, 37-48.
Dean et al., "Biochemistry and Pathology of Radical-mediated Protein Oxidation," Biochem. J., 324, 1997, 1-18.
Doi et al., "Low-Protein Diet Suppresses Serum Insulin-Like Growth Factor-1 and Decelerates the Progression of Growth Hormone-Induced Glomerulosclerosis," American Journal of Nephrology, 21, 2001, 331-339.
Elj et al., "Additive Effect of Diets and Training on Total Insulin-like Growth Factor-1 (IGF-1) in Rats, Annales d'Endocrinologie," 71, 2010, 297-302.
Espert et al., "What is the Role of Autophagy in HIV-1 Infection?" Autophagy, 4:3, Apr. 1, 2008, 273-275.
Evans et al., "TOR Signaling Never Gets Old: Aging, Longevity and TORC1 Activity," Ageing Research Reviews, 10 2011, 225-237.
Fanson et al., "Nutrients, not Caloric Restriction, Extend Lifespan in Queensland Fruit Flies (Bactrocera tryoni)," Aging Cell, 8, 2009, 514-523.
Fau et al., "Effects of Ingestion of High Protein or Excess Methionine Diets by Rats for Two Years," The Journal of Nutrition, 118, 1998, 128-133.
Feng, "p53 Regulation of the IGF-1/AKT/mTOR Pathways and the Endosomal Compartment," Cold Spring Harb Perspect Biology, 2, 2010, 1-10.
Fernandes, "Influence of Diet on Survival of mice," Proc. Nat. Acad. Sci. USA, vol. 73, No. 4, Apr. 1976, 1279-1283.
Flatt, "Diet and longevity in the balance," Nature, vol. 462|24/31, Dec. 2009, 989-990.
Giannakou et al., "Role of insulin-like signalling in *Drosophila* lifespan," TRENDS in Biochemical Sciences, vol. 32 No. 4, 180-188.

(Continued)

*Primary Examiner* — Michele L Jacobson
*Assistant Examiner* — Subbalakshmi Prakash
(74) *Attorney, Agent, or Firm* — James W. Hill

(57) ABSTRACT

Methods for preventing and treating disease include (i) providing to a person a nutrient material including at least one of lipid or carbohydrate, wherein protein constitutes less than 5 percent of the material's caloric content; (ii) instructing that, during a lower-protein time period of at least two days, the material be administered such that the person's intake of protein is less than 30 grams per day; (iii) instructing that nutrition be administered to the person such that the person's bodily intake of carbohydrate constitutes at least 40 percent of the person's intake of calories during the lower-protein period; and (iv) instructing that, during a higher-protein time period of at least 24 hours following the lower-protein period, the person receives an average daily protein intake of at least 40 grams.

17 Claims, No Drawings

(56) References Cited

OTHER PUBLICATIONS

Gillette-Guyonne et al., "Caloric restriction and brain function," Current Opinion in Clinical Nutrition and Metabolic Care, 11, 2008, 686-692.
Gomez et al', "Effect of 8.5% and 25% caloric restriction on mitochondrial free radical production and oxidative stress in rat liver," Biogerontology, 8, 2007, 555-566.
Gomez et al., "Effect of methionine dietary supplementation on mitochondrial oxygen radical generation and oxidative DNA damage in rat liver and heart," J Bioenerg Biomembr, 41, 2009, 309-321.
Goodrick, "Body Weight Increment and Length of Life: The Effect of Genetic Constitution and Dietary Protein," Journal of Gerontology, vol. 33, No. 2, 1978, 184-190.
Gredilla et al., "Minireview: The Role of Oxidative Stress in Relation to Caloric Restriction and Longevity," Endocrinology, 146(9), Sep. 2005, 3713-3717.
Hansen et al., "A Role for Autophagy in the Extension of Lifespan by Dietary Restriction in C. elegans," Plos Genetics, vol. 4, Issue 2, Feb. 2008, 0001-0014.
Hara et al., Suppression of basal autophagy in neural cells causes neurodegenerative disease in mice, Nature, vol. 441, Jun. 2006, 885-889.
Harakova et al., "The effect of low protein-high dextrin diet and subsequent food restriction upon life prolongation in fischer 344 male rats," Mechanisms of Ageing and Development, 45, 1988, 1-7.
Huffman et al., "Effect of exercise and calorie restriction on biomarkers of aging in mice," American Journal Physiolgy Regulatory Integrative Composition Physiology, 294, 2008, R1618-R1627.
Irrcher et al., "Parkinson's Disease: To Live or Die by Autophagy," Science Signaling, vol. 2, Issue 65, Apr. 2009, 1-4.
Jia et al,. "Autophagy is Required for Dietary Restriction-Mediated Life Span Extension in C. elegans," Autophagy 3:6, Nov./Dec. 2007, 597-599.
Kaklamani et al., "Dietary Fat and Carbohydrates Are Independently Associated With Circulating Insulin-Like Growth Factor 1 and Insulin-Like Growth Factor—Binding Protein 3 Concentrations in Healthy Adults," Journal of Clinical Oncology, vol. 17, No. 10, Oct. 1999, 3291-3298.
Keller et al., "Autophagy, proteasomes, lipofuscin, and oxidative stress in the aging brain," The International Journal of Biochemistry & Cell Biology, 36, 2004, 2376-2391.
Kennedy et al., "Visions & Reflections (Minireview) Ruminations on dietary restriction and aging," Cellular Molecule Life Sciences, 64, 2007, 1323-1328.
Knaevelsrud et al., "Fighting disease by selective autophagy of aggregate-prone proteins," FEBS Letters 584, 2010, 2635-2645.
Komatsu et al., "Constitutive autophagy: vital role in clearance of unfavorable proteins in neurons," Cell Death and Differentiation, 14, 2007, 887-894.
Komatsu et al., "Loss of autophagy in the central nervous system causes neurodegeneration in mice," Nature, vol. 441, Jun. 2006, 880-884.
Kritchevsky, "Caloric Restriction and Experimental Carcinogenesis," Toxicological Sciences, 52, 1999, 13-16.
Kroemer, "Autophagic cell death: the story of a misnomer," Nature Reviews Molecular Cell Biology, AoP, published online Oct. 30, 2008, 1-7.
Lambert, "Effect of ageing and caloric restriction on specific markers of protein oxidative damage and membrane peroxidizability in rat liver mitochondria," Mechanisms of Ageing and Development 125, 2004, 529-538.
Lambert, "Effect of caloric restriction on mitochondrial reactive oxygen species production and bioenergetics: reversal by insulin," American Journal Physiology Regular Integration Composition Physiology, 286, 2004, R71-R79.
Lee, "Autophagy in neurodegeneration: two sides of the same coin," BMB Reports, May 2009, 324-330.

Leto et al., "Dietary Protein, Life-Span, and Biochemical Variables in Female Mice," Journal of Gerontology, vol. 31, No. 2, 1976, 144-148.
López-Torres et al., "Lowered methionine ingestion as responsible for the decrease in rodent mitochondrial oxidative stress in protein and dietary restriction Possible implications for humans," Biochimica et Biophysica Acta 1780, 2008 1337-1347.
Lynch et al., "Increased Hepatic Lipid Peroxidation with Methionine Toxicity in the Rat," Free Radical Research Communications, vol. 5, No. 4-5, 1988, 221-226.
Finn et al., "Ketone Bodies Stimulate Chaperone-mediated Autophagy," The Journal of Biological Chemistry, vol. 280, No. 2, May 9, 2005, 25864-25870.
Mignery, "Protein Cycling Diet," Chapters dated from Dec. 31, 2008, to Oct. 18, 2011, accessed at <http: //proteincyclingdiet. wordpress.com> on Nov. 1, 2012.
Whiton, "The Whiton Protocol," accessed at < http://joshwhiton. com/?p=1680> on Dec. 10, 2012.
Whiton, "Autophagy," accessed at <http://joshwhiton.com/ ?p=1319> on Dec. 10, 2012.
Grandison et al., "Amino-acid imbalance explains extension of lifespan by dietary restriction in *Drosophila*," Nature, vol. 462, 24/31, Dec. 2009, 1061-1065.
Martinez-Vicente et al., "Autophagy and neurodegeneration: when the cleaning crew goes on strike," Lancet Neurol, vol. 6, 2007, 352-361.
Williams et al., "Aggregate—Prone Proteins Are Cleared from the Cytosol by Autophagy: Therapeutic Implications," Current Topics in Developmental Biology, vol. 76, 2006.
Williams et al., "Novel targets for Huntington's disease in an mTORindependent autophagy pathway," Nature Chemical Biology, vol. 4, No. 5, May 2008, 295-305.
Witte et al., "Caloric restriction improves memory in elderly humans," PNAS, vol. 106, No. 4, Jan. 27, 2009, 1255-1260.
Wong et al., "Autophagy gone awry in neurodegenerative diseases," nature neuroscience, vol. 13, No. 7, Jul. 2010, 805-811.
Wu et al., "Macroautophagy and ERK phosphorylation counteract the antiproliferative effect of proteasome inhibitor in gastric cancer cells," Autophagy, 6:2, Feb. 16, 2010, 228-238.
Xilouri et al., "Abberant a-Synuclein Confers Toxicity to Neurons in Part through Inhibition of Chaperone-Mediated Autophagy," PLoS, vol. 4, Issue 5, May 2009, 1-15.
Yang et al., "Dysregulation of autophagy and Parkinson's disease: the MEF2D link," Apoptosis, 15, 2010, 1410-1414.
Yen et al., "How to Live Long and Prosper: Autophagy, Mitochondria, and Aging," Physiology 23, 2008, 248-262.
Yu et al., "Nutritional Influences on Aging of Fischer 344 Rats: I. Physical, Metabolic, and Longevity Characteristics," Journal of Gerontology, vol. 40. No. 6, 1985, 657-670.
Zhang et al., "Regulation of cellular growth by the *Drosophila* target of rapamycin dTOR," Genes Dev. vol. 14, 2000, 2712-2724.
Zhang et al., "Restoration of chaperone-mediated autophagy in aging liver improves cellular maintenance and hepatic function," Nature Medicine, vol. 14, No. 9, Sep. 2008, 959-965.
Zimmerman et al., "Nutritional control of aging," Experimental Gerontology, 38, 2003, 47-52.
Ayala et al., Dietary Protein Restriction Decreases Oxidative Protein Damage, Peroxidizability Index, and Mitochondrial Complex I Content in Rat Liver, Journal of Gerontology: Biological Sciences, 2007, vol. 62A, No. 4, 352-360.
Bergamini et al., The anti-ageing effects of caloric restriction may involve stimulation of macroautophagy and lysosomal degradation, and can be intensified pharmacologically, Biomedicine & Pharmacotherapy 57, 2003, 203-208.
Brenner et al., Dietary Protein Intake and the Progressive Nature of Kidney Disease: The role of Hemodynamically Mediated Glomerular Injury in the Pathogenesis of Progressive Glomerular Sclerosis in Aging, Renal Ablation, and Intrinsic Renal Disease, The New England Journal of Medicine, vol. 307, No. 11, Sep. 9, 1982, 652-659.
Carnes et al., "Can Human Biology Allow Most of Us to Become Centenarians?" Journals of Gerontology: Biological Sciences, May 1, 2012, 1-7.

(56) References Cited

OTHER PUBLICATIONS

Stegink et al., "Plasma amino acid concentrations and amino acid ratios in normal adults and adults heterozygous for phenylketonuria ingesting a hamburger and milk shake meal," The American Journal of Clinical Nutrition, vol. 53, 1991, 670-675.
Cohen et al., "Reduced IGF-1 Signaling Delays Age-Associated Proteotoxicity in Mice," Cell 139, Dec. 11, 2009, 1157-1169.
Goldman et al., "Autophagy and adipogenesis Implications in obesity and type II diabetes," Autophagy 6:1, Jan. 1, 2010, 179-181.
Hulbert, "Life, death and membrane bilayers," The Journal of Experimental Biology 206, Mar. 24, 2003, 2303-2311.
Lapointe et al., "When a theory of aging ages badly," Cell. Mol. Life Sci. 67, 2010, 1-8.
Leeuwenburgh et al., "Mitochondria and Ageing," Journal of Aging Research, vol. 2011, Article ID 782946, May 26, 2011. 1-3.
Melnik et al., "Over-stimulation of insulin/IGF-1 signaling by western diet may promote diseases of civilization: lessons learnt from laron syndrome," Melnik et al. Nutrition & Metabolism, vol. 8, 2011, 1-4.
Mortimore et al.,"Intracecellular Protein Catabolism and its Control During Nutrient Deprivation and Supply," Ann. Rev. Nutr. vol. 7, 1987, 539-564.
Mortimore et al., "Multiphasic Control of Hepatic Protein Degradation by Regulatory Amino Acids," vol. 262, No. 34, Issue of Dec. 5, 1987, 16322-16327.
Nilsson et al., Effects on cognitive performance of modulating the postprandial blood glucose profile at breakfast, European Journal of Clinical Nutrition, vol. 66, Jul. 11, 2012, 1039-1043.
Patschan et al., "The missing link between non-enzymatically glycated proteins inducing apoptosis and premature senescence of endothelial cells?" Autophagy 4:4, May 16, 2008, 521-523.
Poso et al., "Requirement for alanine in the amino acid control of deprivationinduced protein degradation in liver," Proc. Natl. Acad. Sci. USA, vol. 81, Jul. 1984, 4270-4274.
Seneff et al., "Nutrition and Alzheimer's disease: The detrimental role of a high carbohydrate diet," European Journal of Internal Medicine, Dec. 27, 2010, 1-7.
Simpson et al., "Macronutrient balance and lifespan," Aging, vol. 1, No. 10, Oct. 2009, 875-880.
Lin et al., "Loco signaling pathway in longevity," Small GTPases 2:3, May/Jun. 2011, 158-161.
Fleming et al., The Effect of High-Protein Diets on Coronary Blood Flow, Angiology, vol. 51, No. 10, Oct. 2000, 817-826.
Whiton, "The Whiton Protocol," Mar. 31, 2012, accessed at < http://joshwhiton.com/?p=1680> on Dec. 10, 2012.
Whiton, "Autophagy," Sep. 17, 2011, accessed at <http://joshwhiton.com/?p=1319> on Dec. 10, 2012.
Meada et al., "Natural Influences on Aging on Fischer 344 Rats: II. Pathology," Journal of Gerontology, vol. 40, No. 6, 1985, 671-688.
Mair et al., "Aging and Survival: The Genetics of Life Span Extension by Dietary Restriction," Annual Review Biochemistry, 77, 2008, 727-754.
Maklakov et al., "Sex differences in nutrient-dependent reproductive ageing," Aging Cell, 8, 2009, 324-330.
Maklakov et al., "Sex-Specific Fitness Effects of Nutrient Intake on Reproduction and Lifespan," Current Biology, 18, Jul. 2008, 1062-1066.
Martinez-Vicente et al., "Cargo recognition failure is responsible for inefficient autophagy in Huntington's disease," Nature Neuroscience, vol. 13, No. 5, May 2010, 567-578.
Mathias et al., "Homocysteine induced arteriosclerosis-like alterations of the aorta in normotensive and hypertensive rats following application of high doses of methionine," Atherosclerosis, 122, 1996, 201-216.
Mehrpour et al., "Autophagy in health and disease. 1. Regulation and significance of autophagy: an overview," American Journal Physiology Cellular Physiology, 298, 2010, C776-C785.
Mehrpour et al., "Overview of macroautophagy regulation in mammalian cells," Cell Research, 20, 2010, 748-762.

Meyer et al., "Long-Term Caloric Restriction Ameliorates the Decline in Diastolic Function in Humans," Journal of the American College of Cardiology, vol. 47, No. 2, 2006, 398-402.
Miller et al., "Longetivity and Protein Intake," Experimental Gerontology, vol. 3, 1968, 231-234.
Miller et al., "Methionine-deficient diet extends mouse lifespan, slows immune and lens aging, alters glucose, T4, IGF-I and insulin levels, and increases hepatocyte MIF levels and stress resistance," Aging Cell, vol. 4, 2005, 119-125.
Mizushima et al., "Intracellular Quality Control by Autophagy How Does Autophagy Prevent Neurodegeneration?" Autophagy 2:4, 302-304; Oct./Nov./Dec. 2006, 302-304.
Morck, "Caloric Restriction and Autophagy in Caenorhabditis elegans," Autophagy 3:1, Jan./Feb. 2007, 51-53.
Mori et al., "Effect of Long-Term Excessive L-Methionine Consumption on Transferrin Receptor Abundance and Mitochondrial $H_2O_2$ Generation in Rat Liver," Journal of Health Science, 50(3), 2004, 277-285.
Mori et al., "Long-Term Consumption of a Methionine-Supplemented Diet Increases Iron and Lipid Peroxide Levels in Rat Liver," The Journal of Nutrition, 130, 2000, 2349-2355.
Moskovitz et al., "Methionine sulfoxide reductase (MsrA) is a regulator of antioxidant defense and lifespan in mammals," vol. 98, No. 23, Nov. 2001, 12920-02925.
Murtagh-Mark et al., Source of Dietary Carbohydrate Affects Life Span of Fischer 344 Rats Independent of Caloric Restriction, Journal of Gerontology: Biological Sciences, vol. 50A, No. 3, 1995, B148-B154.
Oldham et al., "Insulin/IGF and target of rapamycin signaling: a TOR de force in growth control," TRENDS in Cell Biology vol. 13, No. 2, Feb. 2003, 79-85.
Orentreich et al., "Low Methionine Ingestion by Rats Extends Life Span," The Journal of Nutrition, 123, 1993, 269-274.
Pamplona, "Mitochondrial oxidative stress, aging and caloric restriction: The protein and methionine connection," Biochimica et Biophysica Acta 1757, 2006, 496-508.
Pamplona, "Oxidative, glycoxidative and lipoxidative damage to rat heart mitochondrial proteins is lower after 4 months of caloric restriction than in age-matched controls," Mechanisms of Ageing and Development, 123, 2002, 1437-1446.
Pan et al., "The role of autophagy-lysosome pathway in neurodegeneration associated with Parkinson's disease," Brain, 131, 2008, 1969-1978.
Partridge et al., "Ageing in *Drosophila*: The role of the insulin/Igf and TOR signalling network," Experimental Gerontology, 46, 2011, 376-381.
Petzke et al., "Plasma protein carbonyl concentration is not enhanced by chronic intake of high-protein diets in adult rats," Journal of Nutritional Biochemistry 10, 1999, 268-273.
Portero-Otin et al., "Protein nonenzymatic modifications and proteasome activity in skeletal muscle from the short-lived rat and long-lived pigeon," Experimental Gerontology 39, 2004, 1527-1535.
Rajawat et al., "Autophagy in aging and in neurodegenerative disorders," Hormones 7(1), 2008, 46-61.
Rami, "Review: Autophagy in neurodegeneration: firefighter and/or incendiarist?" Neuropathology and Applied Neurobiology, 35, 2009, 449-461.
Ramsey et al., "Restriction of Energy Intake, Energy Expenditure, and Aging," Free Radical Biology & Medicine, vol. 29, No. 10, 2000, 946-968.
Richie et al., "Methionine restriction increases blood glutathione and longetivity in F344 rats," Faseb Journal, 8, 1994, 1302, 1307.
Richie et al., "Tissue Glutathione and Cysteine Levels in Methionine-Restricted Rats," Nutrition, 20, 2004, 800-805.
Rincon et al., "The paradox of the insulin/IGF-1 signaling pathway in longevity," Mechanisms of Ageing and Development, 125, 2004, 397-403.
Robin et al., "Effect of a methionine-supplemented diet on the blood pressure of Sprague-Dawley and deoxycorticosterone acetate-salt hypertensive rats," British Journal of Nutrition, 91, 2004, 857-865.

(56) References Cited

OTHER PUBLICATIONS

Rodrigues et al., "Liver Response to Low-Hexachlorobenzene Exposure in Protein- or Energy-Restricted Rats," Food and Chemical Toxicology, vol. 29, No. 11, 1991, 757-764.
Ross et al., "Food Preference and Length of Life," Science, New Series, vol. 190, No. 4210, Oct. 10, 1975, 165-167.
Ross, "Length of Life and Nutrition in the Rat," The Journal of Nutrition, 75, 1961, 197-210.
Ruan, "High-quality life extension by the enzyme peptide methionine sulfoxide reductase," Proceedings of the National Academy of Sciences, vol. 99, No. 5, Mar. 2002, 2748-2753.
Sanz et al., "Carbohydrate restriction does not change mitochondrial free radical generation and oxidative DNA damage," Journal of Biogenetics and Biomembranes, 38, 2006, 327-333.
Sanz et al., "Effect of insulin and growth hormone on rat heart and liver oxidative stress in control and caloric restricted animals," Biogerontology, 2005, 6, 15-26.
Sanz et al., "Effect of Lipid Restriction on Mitochondrial Free Radical Production and Oxidative DNA Damage," Annals of The New York Academy of Science, 1067, 2006, 200-209.
Sanz et al., "Methionine restriction decreases mitochondrial oxygen radical generation and leak as well as oxidative damage to mitochondrial DNA and proteins," Faseb Journal, 20, 2006, 1064-1073.
Sanz et al., "Protein Restriction Without Strong Caloric Restriction Decreases Mitochondrial Oxygen Radical Production and Oxidative DNA Damage in Rat Liver," Journal of Bioenergetics and Biomembranes, vol. 36, No. 6, Dec. 2004, 545-552.
Simonsen et al, "Stimulating the cell's appetite for itself," Nature Chemical Biology, vol. 3, No. 6, Jun. 2007.
Simpson et al., "Caloric Restriction and Aging Revisited: The Need for a Geometric Analysis of the Nutritional Bases of Aging," Journal of Gerontology: Biological Sciences, 2007, vol. 62A, No. 7, 707-713.
Stadtman et al., "Methionine oxidation and aging," Biochimica et Biophysica Acta, 1703, 2005, 135-140.
Stanfel et al., "The TOR pathway comes of age," Biochimica et Biophysica Acta, 1790, 2009, 1067-1074.
Stoltzner, "Effects of Life-long Dietary Protein Restriction on Mortality, Growth, Organ Weights, Blood Counts, Liver Aldolase and Kidney Catalase in Balb/C Mice," Growth, 41, 1997, 337-348.
Terman et al., "Ceroid/lipofuscin formation in cultured human fibroblasts: the role of oxidative stress and lysosomal proteolysis," Mechanisms of Ageing and Development, 104, 1998, 277-291.
Ternan et al., "Ceroid/lipofuscin-loaded human fibroblasts show decreased survival time and diminished autophagocytosis during amino acid starvation," Experimental Gerontology, 34, 1999, 943-957.
Toborek et al., "Increased lipid peroxidation as a mechanism of methionine-induced atherosclerosis in rabbits," Atherosclerosis, 115, 1995, 217-224.
Uchiyama et al., "Autophagic Neuron Death," Methods in Enzymology, vol. 453, 2009, 33-51.

\* cited by examiner

PROTEIN RESTRICTION FOR DISEASE PREVENTION AND TREATMENT

RELATED APPLICATIONS

This application claims the priority benefit of U.S. Provisional Application No. 61/534,344, filed Sep. 13, 2011; U.S. Provisional Application No. 61/621,959, filed Apr. 9, 2012; U.S. Provisional Application No. 61/671,591, filed Jul. 13, 2012; and U.S. Provisional Application No. 61/679,782, filed Aug. 6, 2012; each of the foregoing applications entitled "Protein Restriction for Disease Prevention and Treatment," and the entirety of each of which is incorporated herein by reference.

FIELD

The subject technology relates generally to human nutrition, health, and disease prevention and treatment.

BACKGROUND

Macroautophagy (sometimes referred to herein as "autophagy") is a cellular "self-eating" process conserved among eukaryotic cells and involving digestion of cytoplasmic components via lysosomes. During starvation, stimulation of autophagy can provide cells with macronutrients to maintain metabolism and energy levels to survive.

SUMMARY

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination and placed into a respective independent clause or into other of the independent clauses. Other clauses can be presented in a similar manner.

1. A method of preventing and/or treating disease, comprising:
   (i) administering nutrients to a person such that the person's dietary intake of protein is restricted to less than 40 grams per day during a lower-protein period of at least two days;
   (ii) after the lower-protein period, administering nutrients to the person such that the person's dietary intake of protein exceeds 40 grams per day during a higher-protein period; and
   (iii) after the higher-protein period, repeating (i) and (ii).
2. The method of clause 1, wherein the administering comprises providing to the person a plurality of meals.
3. The method of clause 1, wherein the administering comprises providing to the person a plurality of meals, at least two of which are configured to be ingested by the person per day.
4. The method of clause 1, wherein the meals are substantially liquid.
5. The method of clause 1, wherein the meals comprise (a) lower-protein meals configured to be administered to the person during the lower-protein period and (b) higher-protein meals configured to be administered to the person during the higher-protein period.
6. The method of clause 1, further comprising administering carbohydrate in a sufficient amount to prevent a negative nitrogen balance exceeding 5 grams of nitrogen per day.
7. The method of clause 1, further comprising administering carbohydrate in a sufficient amount to prevent a negative nitrogen balance exceeding 10 grams of nitrogen per day.
8. The method of clause 1, wherein the person's dietary intake of protein is restricted to less than 0.6 grams/kg body weight/day during the lower-protein period.
9. The method of clause 1, wherein the person's dietary intake of protein is restricted to less than 0.4 grams/kg body weight/day during the lower-protein period.
10. The method of clause 1, wherein the person's dietary intake of protein is restricted to less than 0.3 grams/kg body weight/day during the lower-protein period.
11. The method of clause 1, wherein the person's dietary intake of protein is restricted to less than 0.2 grams/kg body weight/day during the lower-protein period.
12. The method of clause 1, wherein the person's dietary intake of protein is restricted to less than 0.1 grams/kg body weight/day during the lower-protein period.
13. The method of clause 1, wherein the person's dietary intake of protein is restricted to less than 30 grams per day during the lower-protein period.
14. The method of clause 1, wherein the person's dietary intake of protein is restricted to less than 20 grams per day during the lower-protein period.
15. The method of clause 1, wherein the person's dietary intake of protein is restricted to less than 10 grams per day during the lower-protein period.
16. The method of clause 1, wherein the person's dietary intake of protein is restricted to less than 5 grams per day during the lower-protein period.
17. The method of clause 1, wherein the person's dietary intake of protein is restricted to about zero grams per day during the lower-protein period.
18. The method of clause 1, wherein the lower-protein period is at least 3 days.
19. The method of clause 1, wherein the lower-protein period is at least 4 days.
20. The method of clause 1, wherein the lower-protein period is at least 5 days.
21. The method of clause 1, wherein the lower-protein period is at least 6 days.
22. The method of clause 1, wherein the lower-protein period is at least 7 days.
23. The method of clause 1, wherein the lower-protein period is at least 8 days.
24. The method of clause 1, wherein the lower-protein period is at least 9 days.
25. The method of clause 1, wherein the lower-protein period is at least 10 days.
26. The method of clause 1, wherein the lower-protein period is at least 14 days.
27. The method of clause 1, wherein the lower-protein period is at least 21 days.
28. The method of clause 1, wherein the person's dietary intake of protein exceeds 0.8 grams/kg body weight/day during the higher-protein period.
29. The method of clause 1, wherein the person's dietary intake of protein exceeds 1.0 grams/kg body weight/day during the higher-protein period.
30. The method of clause 1, wherein the person's dietary intake of protein exceeds 1.2 grams/kg body weight/day during the higher-protein period.
31. The method of clause 1, wherein the person's dietary intake of protein exceeds 1.4 grams/kg body weight/day during the higher-protein period.

32. The method of clause 1, wherein the person's dietary intake of protein exceeds 1.6 grams/kg body weight/day during the higher-protein period.

33. The method of clause 1, wherein the person's dietary intake of protein exceeds 1.8 grams/kg body weight/day during the higher-protein period.

34. The method of clause 1, wherein the person's dietary intake of protein exceeds 2.0 grams/kg body weight/day during the higher-protein period.

35. The method of clause 1, wherein the person's dietary intake of protein exceeds 50 grams per day during the higher-protein period.

36. The method of clause 1, wherein the person's dietary intake of protein exceeds 60 grams per day during the higher-protein period.

37. The method of clause 1, wherein the person's dietary intake of protein exceeds 70 grams per day during the higher-protein period.

38. The method of clause 1, wherein the person's dietary intake of protein exceeds 80 grams per day during the higher-protein period.

39. The method of clause 1, wherein the person's dietary intake of protein exceeds 90 grams per day during the higher-protein period.

40. The method of clause 1, wherein the person's dietary intake of protein exceeds 100 grams per day during the higher-protein period.

41. The method of clause 1, wherein the higher-protein period is no more than 14 days.

42. The method of clause 1, wherein the higher-protein period is no more than 10 days.

43. The method of clause 1, wherein the higher-protein period is no more than 7 days.

44. The method of clause 1, wherein the higher-protein period is no more than 6 days.

45. The method of clause 1, wherein the higher-protein period is no more than 5 days.

46. The method of clause 1, wherein the higher-protein period is no more than 4 days.

47. The method of clause 1, wherein the higher-protein period is no more than 3 days.

48. The method of clause 1, wherein the higher-protein period is no more than 2 days.

49. The method of clause 1, wherein the higher-protein period is no more than 1 day.

50. A system for preventing and/or treating disease, comprising:
   food; and
   instructions that a person eat the food according to the following:
   (i) during a lower-protein period of at least two days, the person eats a lower-protein portion of the food, such that the person's dietary intake of protein is restricted to less than 40 grams per day; and
   (ii) during a higher-protein period after the lower-protein period, the person eats a higher-protein portion of the food, such that the person's dietary intake of protein exceeds 40 grams per day.

51. The system of clause 50, wherein the instructions further instruct that after the higher-protein period, the person repeat (i) and (ii).

52. The system of clause 50, wherein the food is substantially liquid.

53. The system of clause 50, wherein the food contains sufficient carbohydrate to prevent a negative nitrogen balance exceeding 5 grams of nitrogen per day in a person eating the food according to the instructions.

54. The system of clause 50, wherein the food contains sufficient carbohydrate to prevent a negative nitrogen balance exceeding 10 grams of nitrogen per day in a person eating the food according to the instructions.

55. The system of clause 50, wherein each of the lower-protein portion and the higher-protein portion comprise a plurality of meals configured to be provided to the person.

56. The system of clause 50, wherein the instructions provide for the person's dietary intake of protein to be restricted to less than 0.6 grams/kg body weight/day during the lower-protein period.

57. The system of clause 50, wherein the instructions provide for the person's dietary intake of protein to be restricted to less than 30 grams per day during the lower-protein period.

58. The system of clause 50, wherein the instructions provide for the person's dietary intake of protein to be restricted to less than 20 grams per day during the lower-protein period.

59. The system of clause 50, wherein the instructions provide for the person's dietary intake of protein to be restricted to less than 10 grams per day during the lower-protein period.

60. The system of clause 50, wherein the instructions provide for the person's dietary intake of protein to be restricted to less than 5 grams per day during the lower-protein period.

61. The system of clause 50, wherein the instructions provide for the person's dietary intake of protein to be restricted to about zero grams per day during the lower-protein period.

62. The system of clause 50, wherein the lower-protein period is at least 3 days.

63. The system of clause 50, wherein the lower-protein period is at least 4 days.

64. The system of clause 50, wherein the lower-protein period is at least 5 days.

65. The system of clause 50, wherein the lower-protein period is at least 6 days.

66. The system of clause 50, wherein the lower-protein period is at least 7 days.

67. The system of clause 50, wherein the lower-protein period is at least 8 days.

68. The system of clause 50, wherein the lower-protein period is at least 9 days.

69. The system of clause 50, wherein the lower-protein period is at least 10 days.

70. The system of clause 50, wherein the lower-protein period is at least 14 days.

71. The system of clause 50, wherein the lower-protein period is at least 21 days.

72. The system of clause 50, wherein the instructions provide for the person's dietary intake of protein to exceed 0.8 grams/kg body weight/day during the higher-protein period.

73. The system of clause 50, wherein the instructions provide for the person's dietary intake of protein to exceed 1.0 grams/kg body weight/day during the higher-protein period.

74. The system of clause 50, wherein the instructions provide for the person's dietary intake of protein to exceed 1.2 grams/kg body weight/day during the higher-protein period.

75. The system of clause 50, wherein the instructions provide for the person's dietary intake of protein to exceed 1.4 grams/kg body weight/day during the higher-protein period.

76. The system of clause 50, wherein the instructions provide for the person's dietary intake of protein to exceed 1.6 grams/kg body weight/day during the higher-protein period.

77. The system of clause 50, wherein the instructions provide for the person's dietary intake of protein to exceed 50 grams per day during the higher-protein period.

78. The system of clause 50, wherein the instructions provide for the person's dietary intake of protein to exceed 60 grams per day during the higher-protein period.

79. The system of clause 50, wherein the instructions provide for the person's dietary intake of protein to exceed 70 grams per day during the higher-protein period.

80. The system of clause 50, wherein the instructions provide for the person's dietary intake of protein to exceed 80 grams per day during the higher-protein period.

81. The system of clause 50, wherein the instructions provide for the person's dietary intake of protein to exceed 90 grams per day during the higher-protein period.

82. The system of clause 50, wherein the instructions provide for the person's dietary intake of protein to exceed 100 grams per day during the higher-protein period.

83. The system of clause 50, wherein the higher-protein period is no more than 14 days.

84. The system of clause 50, wherein the higher-protein period is no more than 10 days.

85. The system of clause 50, wherein the higher-protein period is no more than 7 days.

86. The system of clause 50, wherein the higher-protein period is no more than 6 days.

87. The system of clause 50, wherein the higher-protein period is no more than 5 days.

88. The system of clause 50, wherein the higher-protein period is no more than 4 days.

89. The system of clause 50, wherein the higher-protein period is no more than 3 days.

90. The system of clause 50, wherein the higher-protein period is no more than 2 days.

91. The system of clause 50, wherein the higher-protein period is no more than 1 day.

92. A system for preventing and/or treating disease, comprising:
food comprising higher-protein meals and lower-protein meals; and
instructions that a person eat the food as follows:
(i) during a lower-protein period of at least two days, the person eats the lower-protein meals such that the person's dietary intake of protein is restricted to less than 30 grams per day; and
(ii) during a higher-protein period that follows the lower-protein period and is no more than seven days, the person eats the higher-protein meals such that the person's dietary intake of protein exceeds 50 grams per day.

93. The system of clause 92, wherein the instructions further instruct that after the higher-protein period, the person repeat (i) and (ii).

94. The system of clause 92, wherein the lower-protein meals contain sufficient carbohydrate to prevent a negative nitrogen balance exceeding 10 grams of nitrogen per day in a person eating the food according to the instructions.

95. The system of clause 92, wherein the lower-protein meals contain sufficient carbohydrate to prevent a negative nitrogen balance exceeding 5 grams of nitrogen per day in a person eating the food according to the instructions.

96. The system of clause 92, wherein the lower-protein meals and higher-protein meals are substantially liquid.

97. A method of reducing at least one of a likelihood or a severity of disease, comprising:
(i) to a person selected for having at least one of overweight, obesity, hypertension, metabolic syndrome, type 2 diabetes, hyperinsulinemia, or glucose intolerance, administering nutrients to the person such that the person's bodily intake of protein is restricted to less than 40 grams per day during a lower-protein period of at least one day;
(ii) after the lower-protein period, administering nutrients to the person such that the person's bodily intake of protein exceeds 40 grams per day during a higher-protein period; and
(iii) after the higher-protein period, repeating (i) and (ii).

98. The method of clause 97, wherein the lower-protein period is at least two days.

99. The method of clause 97, wherein the diabetes comprises type 2 diabetes.

100. A method of reducing at least one of a likelihood or a severity of disease, comprising:
(i) to a person selected for having at least one of Alzheimer's disease, a genetic predisposition to a familial Alzheimer's disease, or cognitive impairment, administering nutrients to the person such that the person's bodily intake of protein is restricted to less than 40 grams per day during a lower-protein period of at least one day;
(ii) after the lower-protein period, administering nutrients to the person such that the person's bodily intake of protein exceeds 40 grams per day during a higher-protein period; and
(iii) after the higher-protein period, repeating (i) and (ii).

101. The method of clause 100, wherein the lower-protein period is at least two days.

102. A method of reducing at least one of a likelihood or a severity of disease, comprising:
(i) to a person selected for having at least one of a cancerous or a precancerous neoplasia, administering nutrients to the person such that the person's bodily intake of protein is restricted to less than 40 grams per day during a lower-protein period of at least one day;
(ii) after the lower-protein period, administering nutrients to the person such that the person's bodily intake of protein exceeds 40 grams per day during a higher-protein period; and
(iii) after the higher-protein period, repeating (i) and (ii).

103. The method of clause 102, wherein the lower-protein period is at least two days.

104. A method of reducing at least one of a likelihood or a severity of disease, comprising:
(i) to a person selected for having an infection by at least one of a bacterium, a virus, a fungus, or a prion, administering nutrients to the person such that the person's bodily intake of protein is restricted to less than 40 grams per day during a lower-protein period of at least one day;
(ii) after the lower-protein period, administering nutrients to the person such that the person's bodily intake of protein exceeds 40 grams per day during a higher-protein period; and
(iii) after the higher-protein period, repeating (i) and (ii).

105. The method of clause 104, wherein the lower-protein period is at least two days.

106. The method of clause 104, wherein the person is infected with *Mycobacterium tuberculosis*.

107. A method of reducing at least one of a likelihood or a severity of disease, comprising:
  (i) selecting a person having an autoimmune disorder;
  (ii) administering nutrients to the person such that the person's bodily intake of protein is restricted to less than 40 grams per day during a lower-protein period of at least one day;
  (iii) after the lower-protein period, administering nutrients to the person such that the person's bodily intake of protein exceeds 40 grams per day during a higher-protein period; and
  (iv) after the higher-protein period, repeating (i) and (ii).

108. The method of clause 105, wherein the lower-protein period is at least two days.

109. The method of clause 105, wherein the autoimmune disorder comprises at least one of thyroiditis, hyperthyroidism, or hypothyroidism.

110. The method of clause 105, wherein the autoimmune disorder comprises a Human Leukocyte Antigen (HLA) B27 associated disease.

111. The method of clause 105, wherein the autoimmune disorder comprises multiple sclerosis.

112. The method of clause 105, wherein the autoimmune disorder comprises at least one of rheumatoid arthritis, ankylosing spondylitis, an anterior uveitis, or psoriatic arthritis.

113. The method of clause 105, wherein the autoimmune disorder comprises type 1 diabetes.

114. The method of clause 105, wherein the autoimmune disorder comprises Crohn's disease.

115. A method of reducing at least one of a likelihood or a severity of disease, comprising:
  (i) selecting a person having at least one of an inflammatory bowel disease or an increased risk of an inflammatory bowel disease;
  (ii) administering nutrients to the person such that the person's bodily intake of protein is restricted to less than 40 grams per day during a lower-protein period of at least one day;
  (iii) after the lower-protein period, administering nutrients to the person such that the person's bodily intake of protein exceeds 40 grams per day during a higher-protein period; and
  (iv) after the higher-protein period, repeating (i) and (ii).

116. The method of clause 115, wherein the lower-protein period is at least two days.

117. The method of clause 115, wherein the inflammatory bowel disease comprises Crohn's disease.

118. The method of clause 115, wherein the inflammatory bowel disease comprises ulcerative colitis.

119. A method of slowing a rate of accumulation of mitochondrial damage in a mammal, comprising:
  (i) administering nutrients to the mammal such that the mammal's bodily intake of protein is restricted to less than 40 grams per day during a lower-protein period of at least one day;
  (iii) after the lower-protein period, administering nutrients to the mammal such that the mammal's bodily intake of protein exceeds 40 grams per day during a higher-protein period; and
  (iv) after the higher-protein period, repeating (i) and (ii).

120. The method of clause 119, wherein the lower-protein period is at least two days.

121. The method of clause 119, wherein the damage comprises DNA oxidation.

122. The method of clause 119, wherein the damage comprises a DNA mutation.

123. The method of clause 119, wherein the damage comprises an RNA mutation.

124. A system for preventing and/or treating disease, comprising:
  nutrient material administrable to at least one of a person's gastrointestinal tract or intravascular space and comprising (a) at least one of lipid or carbohydrate and (b) at least one higher-protein portion and at least one lower-protein portion;
  wherein the material is configured to be administered to the person in the following sequence:
    (i) during a lower-protein period of at least two days, the person receives the at least one lower-protein portion such that the person's bodily intake of protein is restricted to less than 0.4 mg/kg of the person's bodyweight per day; and
    (ii) during a higher-protein period that is after the lower-protein period and is at least one day, the person receives the at least one higher-protein portion such that the person's bodily intake of protein exceeds 0.6 mg/kg of the person's bodyweight per day.

125. The system of clause 124, further comprising instructions that the material be administered according to the sequence.

126. The system of clause 124, wherein the material is configured to be administered to the person orally.

127. The system of clause 124, wherein the material is configured to be administered to the person parenterally.

128. A method of reducing at least one of a likelihood or a severity of disease, comprising:
  (i) administering nutrients to a person such that the person's bodily intake of protein is restricted to less than 40 grams per day during a lower-protein period of at least two days;
  (ii) after the lower-protein period, administering nutrients to the person such that the person's bodily intake of protein exceeds 40 grams per day during a higher-protein period; and
  (iii) after the higher-protein period, repeating (i) and (ii).

129. The method of clause 128, wherein the administering during at least one of the lower-protein period or the higher-protein period is configured for oral ingestion of nutrients by the person.

130. The method of clause 128, wherein the administering during at least one of the lower-protein period or the higher-protein period comprises parenteral administration of nutrients to the person.

131. A method of reducing at least one of a likelihood or a severity of disease, comprising:
  (i) administering nutrients to a person such that the person's bodily intake of protein is restricted to less than 0.4 mg/kg of the person's bodyweight per day during a lower-protein period of at least two days;
  (ii) after the lower-protein period, administering nutrients to the person such that the person's bodily intake of protein exceeds 0.6 mg/kg of the person's bodyweight per day during a higher-protein period; and
  (iii) after the higher-protein period, repeating (i) and (ii).

132. The method of clause 131, wherein the administering during at least one of the lower-protein period or the higher-protein period is configured for oral ingestion of nutrients by the person.

133. The method of clause 131, wherein the administering during at least one of the lower-protein period or the higher-protein period comprises parenteral administration of nutrients to the person.

134. A method of reducing at least one of a likelihood or a severity of disease, comprising:
(i) administering nutrients to a person such that the person's bodily intake of protein is restricted to less than the U.S. recommended daily intake of protein during a lower-protein period of at least two days;
(ii) after the lower-protein period, administering nutrients to the person such that the person's bodily intake of protein meets or exceeds the U.S. recommended daily intake of protein during a higher-protein period of at least two days; and
(iii) after the higher-protein period, repeating (i) and (ii).

135. The method of clause 134, wherein the administering during at least one of the lower-protein period or the higher-protein period is configured for oral ingestion of nutrients by the person.

136. The method of clause 134, wherein the administering during at least one of the lower-protein period or the higher-protein period comprises parenteral administration of nutrients to the person.

137. A method of reducing at least one of a likelihood or a severity of disease, comprising:
(i) to a person selected for having, or being at risk for, age-related macular degeneration, administering nutrients to the person such that the person's bodily intake of protein is restricted to less than 40 grams per day during a lower-protein period of at least one day;
(ii) after the lower-protein period, administering nutrients to the person such that the person's bodily intake of protein exceeds 40 grams per day during a higher-protein period; and
(iii) after the higher-protein period, repeating (i) and (ii).

138. A method of reducing at least one of a likelihood or a severity of disease, comprising:
(i) to a person selected for having age-related macular degeneration, administering nutrients to the person such that the person's bodily intake of protein is restricted to less than 0.4 mg/kg of the person's bodyweight per day during a lower-protein period of at least one day;
(ii) after the lower-protein period, administering nutrients to the person such that the person's bodily intake of protein exceeds 0.6 mg/kg of the person's bodyweight per day during a higher-protein period; and
(iii) after the higher-protein period, repeating (i) and (ii).

139. A method of reducing at least one of a likelihood or a severity of disease, comprising:
(i) to a person selected for having had an ischemic impairment of the person's neurologic function, administering nutrients to the person such that the person's bodily intake of protein is restricted to less than 0.4 mg/kg of the person's bodyweight per day during a lower-protein period of at least one day;
(ii) after the lower-protein period, administering nutrients to the person such that the person's bodily intake of protein exceeds 0.6 mg/kg of the person's bodyweight per day during a higher-protein period; and
(iii) after the higher-protein period, repeating (i) and (ii).

140. A method of reducing at least one of a likelihood or a severity of disease, comprising:
(i) to a person selected for having an atrial dysrhythmia, administering nutrients to the person such that the person's bodily intake of protein is restricted to less than 0.4 mg/kg of the person's bodyweight per day during a lower-protein period of at least one day;
(ii) after the lower-protein period, administering nutrients to the person such that the person's bodily intake of protein exceeds 0.6 mg/kg of the person's bodyweight per day during a higher-protein period; and
(iii) after the higher-protein period, repeating (i) and (ii).

141. The method of clause 140, wherein the atrial dysrhythmia comprises at least one of atrial fibrillation or atrial flutter.

142. A method of reducing at least one of a likelihood or a severity of disease, comprising:
(i) to a person selected for having a ventricular dysrhythmia, administering nutrients to the person such that the person's bodily intake of protein is restricted to less than 0.4 mg/kg of the person's bodyweight per day during a lower-protein period of at least one day;
(ii) after the lower-protein period, administering nutrients to the person such that the person's bodily intake of protein exceeds 0.6 mg/kg of the person's bodyweight per day during a higher-protein period; and
(iii) after the higher-protein period, repeating (i) and (ii).

143. The method of clause 142, wherein the ventricular dysrhythmia comprises at least one of ventricular fibrillation or ventricular tachycardia.

144. A method of reducing at least one of a likelihood or a severity of disease, comprising:
(i) to a person selected for having a ventricular dysrhythmia, administering nutrients to the person such that the person's bodily intake of protein is restricted to less than 0.4 mg/kg of the person's bodyweight per day during a lower-protein period of at least one day;
(ii) after the lower-protein period, administering nutrients to the person such that the person's bodily intake of protein exceeds 0.6 mg/kg of the person's bodyweight per day during a higher-protein period; and
(iii) after the higher-protein period, repeating (i) and (ii).

145. The method of clause 142, wherein the ventricular dysrhythmia comprises at least one of ventricular fibrillation or ventricular tachycardia.

146. A method for providing nutrients to a person to maintain or enhance health, comprising:
to a person selected for having, or being at risk for, male pattern baldness, providing nutrient material administrable to at least one of the person's gastrointestinal tract or intravascular space and comprising at least one of lipid or carbohydrate;
wherein all of any protein in the material constitutes less than 5 percent of a caloric content of the material;
instructing that the material be administered to the person such that the person's bodily intake of all protein is restricted to less than 30 grams per day during a lower-protein time period of at least 48 hours.
instructing that carbohydrate be, or may be, administered to the person such that the person's bodily intake of carbohydrate is at least 40 grams per day during the lower-protein period; and
instructing that, during a higher-protein time period that is after the lower-protein period and is at least 24 hours, the person receives a higher bodily intake of protein than the person received during the lower-protein period.

147. A method for providing nutrients to a person to maintain or enhance health, comprising:
providing nutrient material administrable to at least one of a person's gastrointestinal tract or intravascular space and comprising at least one of lipid or carbohydrate;
wherein all of any protein in the material constitutes less than 5 percent of a caloric content of the material;
instructing that the material be administered to the person such that the person's bodily intake of all protein is restricted to less than 30 grams per day during a lower-protein time period of at least 48 hours.

instructing that carbohydrate be, or may be, administered to the person such that the person's bodily intake of carbohydrate is at least 40 grams per day during the lower-protein period; and instructing that, during a higher-protein time period that is after the lower-protein period and is at least 24 hours, the person receives a higher bodily intake of protein than the person received during the lower-protein period.

148. The method of clause 147, further comprising instructing that the person receives an average daily bodily intake of all protein during the higher-protein period that is at least 40 grams.

149. The method of clause 147, further comprising instructing that no substantial source of protein be administered to the person during the lower-protein period.

150. The method of clause 147, further comprising instructing that the person's bodily intake of carbohydrate be restricted to less than 60 grams per day during the higher-protein period.

151. The method of clause 147, further comprising instructing that the person's bodily intake of carbohydrate be restricted to less than 50 grams per day during the higher-protein period.

152. The method of clause 147, further comprising instructing that the person's bodily intake of carbohydrate be restricted to less than 40 grams per day during the higher-protein period.

153. The method of clause 147, further comprising instructing that the person's bodily intake of carbohydrate be restricted to less than 30 grams per day during the higher-protein period.

154. The method of clause 147, further comprising instructing that the person's bodily intake of carbohydrate be restricted to less than 20 grams per day during the higher-protein period.

155. The method of clause 147, further comprising instructing that the person's bodily intake of carbohydrate be restricted to less than 10 grams per day during the higher-protein period.

156. The method of clause 147, further comprising instructing that the person's bodily intake of carbohydrate be restricted to substantially zero grams per day during the higher-protein period.

157. The method of clause 147, wherein the material comprises at least some of the carbohydrate administered to the person during the lower-protein period.

158a. The method of clause 147, wherein the providing the material comprises providing individually packaged servings of the material, and the all of any protein in the material constitutes no more than 15 grams per serving.

158b. The method of clause 147, wherein the providing the material comprises providing individually packaged servings of the material, and the all of any protein in the material constitutes no more than 10 grams per serving.

158c. The method of clause 147, wherein the providing the material comprises providing individually packaged servings of the material, and the all of any protein in the material constitutes no more than 5 grams per serving.

158d. The method of clause 147, wherein the providing the material comprises providing individually packaged servings of the material, and the all of any protein in the material constitutes about zero grams per serving.

159. The method of clause 147, wherein the material is configured to be administered to the person orally.

160. The method of clause 147, wherein the material is configured to be administered to the person parenterally.

161. The method of clause 147, wherein material comprises carbohydrate, and the instructing that carbohydrate be, or may be, administered to the person comprises instructing that the material be administered to the person such that the person's bodily intake of carbohydrate in the material is at least 40 grams per day during the lower-protein period.

162. The method of clause 147, further comprising instructing that the material be administered to the person such that the person's bodily intake of all protein is restricted to less than 20 grams per day during the lower-protein period.

163. The method of clause 147, further comprising instructing that the material be administered to the person such that the person's bodily intake of all protein is restricted to less than 10 grams per day during the lower-protein period.

164. The method of clause 147, further comprising instructing that the material be administered to the person such that the person's bodily intake of all protein is restricted to about zero grams per day during the lower-protein period.

165a. The method of clause 147, further comprising instructing that the material be administered to the person such that the person's bodily intake of all protein is restricted to less than 0.1 g per kilogram of the person's bodyweight per day during the lower-protein period.

165b. The method of clause 147, further comprising instructing that the material be administered to the person such that the person's bodily intake of all protein is restricted to less than 0.2 g per kilogram of the person's bodyweight per day during the lower-protein period.

165c. The method of clause 147, further comprising instructing that the material be administered to the person such that the person's bodily intake of all protein is restricted to less than 0.3 g per kilogram of the person's bodyweight per day during the lower-protein period.

165d. The method of clause 147, further comprising instructing that the material be administered to the person such that the person's bodily intake of all protein is restricted to less than 0.4 g per kilogram of the person's bodyweight per day during the lower-protein period.

165e. The method of clause 147, further comprising instructing that the material be administered to the person such that the person's bodily intake of all protein is restricted to less than 0.5 g per kilogram of the person's bodyweight per day during the lower-protein period.

166. The method of clause 147, further comprising instructing that, during the higher-protein period, the person receives a bodily intake of all protein of at least 50 grams.

167. The method of clause 147, further comprising instructing that, during the higher-protein period, the person receives a bodily intake of all protein of at least 60 grams.

168. The method of clause 147, further comprising instructing that, during the higher-protein period, the person receives a bodily intake of all protein of at least 70 grams.

169. The method of clause 147, further comprising instructing that, during the higher-protein period, the person receives a bodily intake of all protein of at least 0.5 g per kilogram of the person's body weight.

170. The method of clause 147, further comprising instructing that, during the higher-protein period, the person receives a bodily intake of all protein of at least 0.6 g per kilogram of the person's body weight.

171. The method of clause 147, further comprising instructing that, during the higher-protein period, the person receives a bodily intake of all protein of at least 0.7 g per kilogram of the person's body weight.

172. The method of clause 147, further comprising instructing that, during the higher-protein period, the person receives a bodily intake of all protein of at least 0.8 g per kilogram of the person's body weight.

173. The method of clause 147, wherein the lower-protein period is at least 3 days.

174. The method of clause 147, wherein the lower-protein period is at least 4 days.

175. The method of clause 147, wherein the lower-protein period is at least 5 days.

176. The method of clause 147, wherein the lower-protein period is at least 6 days.

177. The method of clause 147, wherein the lower-protein period is at least 7 days.

178. The method of clause 147, wherein the higher-protein period is no more than 14 days.

179. The method of clause 147, wherein the higher-protein period is no more than 10 days.

180. The method of clause 147, wherein the higher-protein period is no more than 7 days.

181. The method of clause 147, wherein the higher-protein period is no more than 6 days.

182. The method of clause 147, wherein the higher-protein period is no more than 5 days.

183. The method of clause 147, wherein the higher-protein period is no more than 4 days.

184. The method of clause 147, wherein the higher-protein period is no more than 3 days.

185. The method of clause 147, wherein the higher-protein period is no more than 2 days.

186. A method for providing nutrients to a person to maintain or enhance health, comprising:
  providing nutrient material administrable to at least one of a person's gastrointestinal tract or intravascular space and comprising at least one of lipid or carbohydrate;
  wherein all of any protein in the material constitutes less than 5 percent of a caloric content of the material;
  instructing that the material be administered to the person such that the person's bodily intake of at least one of protein, peptides, or amino acids is restricted to less than 30 grams per day during a lower-protein time period of at least 48 hours;
  instructing that carbohydrate be, or may be, administered to the person such that the person's bodily intake of carbohydrate is at least 40 grams per day during the lower-protein period; and
  instructing that, during a higher-protein time period that is after the lower-protein period and is at least 24 hours, the person receives a higher bodily intake of protein than the person received during the lower-protein period, such that the average daily bodily intake of all protein during the higher-protein period is at least 40 grams.

187. A method for providing nutrients to a person to maintain or enhance health, comprising:
  providing nutrient material administrable to at least one of a person's gastrointestinal tract or intravascular space and comprising at least one of lipid or carbohydrate;
  wherein all of any protein in the material constitutes less than 5 percent of a caloric content of the material;
  instructing that the material be administered to the person such that the person's bodily intake of all protein is restricted to less than 30 grams per day during a lower-protein time period of at least 48 hours;
  instructing that carbohydrate be administered to the person such that the person's bodily intake of carbohydrate is at least 40 grams per day, and is not limited to 150 grams per day, during the lower-protein period; and
  instructing that, during a higher-protein time period that is after the lower-protein period and is at least 24 hours, the person receives a higher bodily intake of protein than the person received during the lower-protein period.

188. The method of clause 187, further comprising instructing that carbohydrate be administered to the person such that the person's bodily intake of carbohydrate is not limited to 200 grams per day during the lower-protein period.

189. The method of clause 187, further comprising instructing that carbohydrate be administered to the person such that the person's bodily intake of carbohydrate is not limited to 250 grams per day during the lower-protein period.

190. The method of clause 187, further comprising instructing that carbohydrate be administered to the person such that the person's bodily intake of carbohydrate is not limited to 300 grams per day during the lower-protein period.

191. The method of clause 187, further comprising instructing that carbohydrate be administered to the person such that the person's bodily intake of carbohydrate is not limited to 350 grams per day during the lower-protein period.

192. The method of clause 187, further comprising instructing that carbohydrate be administered to the person such that the person's bodily intake of carbohydrate is not limited to 400 grams per day during the lower-protein period.

193. The method of clause 187, further comprising instructing that carbohydrate be administered to the person such that the person's bodily intake of carbohydrate is not limited to 500 grams per day during the lower-protein period.

194. The method of clause 187, further comprising instructing that carbohydrate be administered to the person such that the person's bodily intake of carbohydrate is not limited to 600 grams per day during the lower-protein period.

195. The method of clause 187, further comprising instructing that carbohydrate be administered to the person such that the person's bodily intake of carbohydrate is not limited to 700 grams per day during the lower-protein period.

196. A method for providing nutrients to a person to maintain or enhance health, comprising:
  (a) providing nutrient material administrable to at least one of a person's gastrointestinal tract or intravascular space and comprising at least one of lipid or carbohydrate;
  (b) wherein all of any protein in the material constitutes no more than 10 percent of a caloric content of the material;
  (c) instructing that the material be administered to the person such that the person's bodily intake of all protein is restricted to less than 30 grams per day during a lower-protein time period of at least 48 hours;
  (d) instructing that nutrition be administered to the person such that the person's bodily intake of carbohydrate constitutes at least 40% of the person's bodily intake of calories during the lower-protein period; and (e) instructing that, during a higher-protein time period that is after the lower-protein period and is at least 24 hours, the person receives a higher daily bodily intake of protein than the person received during the lower-protein period.

196a. The method of clause 196, further comprising repeating steps (c) and (e).

196aa. The method of clause 196, further comprising instructing that the material be administered to the person such that the person's bodily intake of all protein is restricted to less than 5 percent of the person's bodily intake of calories during the lower-protein.

196b. The method of clause 196, further comprising instructing that the material be administered to the person such that the person's bodily intake of all protein is restricted to less than 10 percent of the person's bodily intake of calories during the lower-protein.

196c. The method of clause 196, further comprising instructing that the material be administered to the person such that the person's bodily intake of all protein is restricted to less than 15 percent of the person's bodily intake of calories during the lower-protein.

196d. The method of clause 196, further comprising instructing that the material be administered to the person such that the person's bodily intake of all protein is restricted to less than 20 percent of the person's bodily intake of calories during the lower-protein.

196e. The method of clause 196, wherein the all of any protein in the material constitutes no more than 8 percent of the caloric content of the material.

196f. The method of clause 196, wherein the all of any protein in the material constitutes no more than 5 percent of the caloric content of the material.

196g. The method of clause 196, wherein the all of any protein in the material constitutes no more than 3 percent of the caloric content of the material.

197. The method of clause 196, further comprising instructing that carbohydrate be administered to the person such that the person's bodily intake of carbohydrate constitutes at least 50 percent of the person's bodily intake of calories during the lower-protein period.

198. The method of clause 196, further comprising instructing that carbohydrate be administered to the person such that the person's bodily intake of carbohydrate constitutes at least 60 percent of the person's bodily intake of calories during the lower-protein period.

199. The method of clause 196, further comprising instructing that carbohydrate be administered to the person such that the person's bodily intake of carbohydrate constitutes at least 70 percent of the person's bodily intake of calories during the lower-protein period.

200. The method of clause 196, further comprising instructing that carbohydrate be administered to the person such that the person's bodily intake of carbohydrate constitutes at least 80 percent of the person's bodily intake of calories during the lower-protein period.

201. The method of clause 196, further comprising instructing that carbohydrate be administered to the person such that the person's bodily intake of carbohydrate constitutes at least 90 percent of the person's bodily intake of calories during the lower-protein period.

202. The method of clause 196, further comprising instructing that carbohydrate be administered to the person such that the person's bodily intake of carbohydrate is at least 40 grams per day during the lower-protein period.

203. The method of clause 196, further comprising instructing that carbohydrate be administered to the person such that the person's bodily intake of carbohydrate is at least 60 grams per day during the lower-protein period.

204. The method of clause 196, further comprising instructing that carbohydrate be administered to the person such that the person's bodily intake of carbohydrate is at least 80 grams per day during the lower-protein period.

205. The method of clause 196, further comprising instructing that carbohydrate be administered to the person such that the person's bodily intake of carbohydrate is at least 100 grams per day during the lower-protein period.

206. The method of clause 196, further comprising instructing that carbohydrate be administered to the person such that the person's bodily intake of carbohydrate is at least 120 grams per day during the lower-protein period.

207. The method of clause 196, further comprising instructing that carbohydrate be administered to the person such that the person's bodily intake of carbohydrate is at least 140 grams per day during the lower-protein period.

208. The method of clause 196, further comprising instructing that carbohydrate be administered to the person such that the person's bodily intake of carbohydrate is at least 160 grams per day during the lower-protein period.

209. The method of clause 196, further comprising instructing that carbohydrate be administered to the person such that the person's bodily intake of carbohydrate is at least 180 grams per day during the lower-protein period.

210. The method of clause 196, further comprising instructing that carbohydrate be administered to the person such that the person's bodily intake of carbohydrate is at least 200 grams per day during the lower-protein period.

211. The method of clause 196, wherein carbohydrate in the material constitutes at least 50 percent of the caloric content of the material.

212. The method of clause 196, wherein carbohydrate in the material constitutes at least 60 percent of the caloric content of the material.

213. The method of clause 196, wherein carbohydrate in the material constitutes at least 70 percent of the caloric content of the material.

214. The method of clause 196, wherein carbohydrate in the material constitutes at least 80 percent of the caloric content of the material.

215. The method of clause 196, wherein carbohydrate in the material constitutes at least 90 percent of the caloric content of the material.

216. The method of clause 196, further comprising instructing that the person receives an average daily bodily intake of all protein during the higher-protein period that is at least 40 grams.

217. The method of clause 196, further comprising instructing that no substantial source of protein be administered to the person during the lower-protein period.

218. The method of clause 196, wherein the material comprises at least some of the carbohydrate administered to the person during the lower-protein period.

219. The method of clause 196, wherein the providing the material comprises providing individually packaged servings of the material, and the all of any protein in the material constitutes no more than 15 grams per serving.

220. The method of clause 196, wherein the material is configured to be administered to the person orally.

221. The method of clause 196, wherein the material is configured to be administered to the person parenterally.

222. The method of clause 196, wherein material comprises carbohydrate, and further comprising instructing that the material be administered to the person such that the person's bodily intake of carbohydrate in the material is at least 40 grams per day during the lower-protein period.

223. The method of clause 196, further comprising instructing that the material be administered to the person such that the person's bodily intake of all protein is restricted to less than 20 grams per day during the lower-protein period.

224. The method of clause 196, further comprising instructing that the material be administered to the person such that the person's bodily intake of all protein is restricted to less than 10 grams per day during the lower-protein period.

225. The method of clause 196, further comprising instructing that the material be administered to the person such that the person's bodily intake of all protein is restricted to about zero grams per day during the lower-protein period.

226. The method of clause 196, further comprising instructing that the material be administered to the person such that the person's bodily intake of all protein is restricted to less than 0.3 g per kilogram of the person's bodyweight per day during the lower-protein period.

227. The method of clause 196, further comprising instructing that, during the higher-protein period, the person receives a bodily intake of all protein of at least 40 grams.

228. The method of clause 196, further comprising instructing that, during the higher-protein period, the person receives a bodily intake of all protein of at least 50 grams.

229. The method of clause 196, further comprising instructing that, during the higher-protein period, the person receives a bodily intake of all protein of at least 60 grams.

230. The method of clause 196, further comprising instructing that, during the higher-protein period, the person receives a bodily intake of all protein of at least 70 grams.

231. The method of clause 196, further comprising instructing that, during the higher-protein period, the person receives a bodily intake of all protein of at least 0.5 g per kilogram of the person's body weight.

232. The method of clause 196, further comprising instructing that, during the higher-protein period, the person receives a bodily intake of all protein of at least 0.6 g per kilogram of the person's body weight.

233. The method of clause 196, further comprising instructing that, during the higher-protein period, the person receives a bodily intake of all protein of at least 0.7 g per kilogram of the person's body weight.

234. The method of clause 196, further comprising instructing that, during the higher-protein period, the person receives a bodily intake of all protein of at least 0.8 g per kilogram of the person's body weight.

235. The method of clause 196, wherein the lower-protein period is at least 3 days.

236. The method of clause 196, wherein the lower-protein period is at least 4 days.

237. The method of clause 196, wherein the lower-protein period is at least 5 days.

238. The method of clause 196, wherein the lower-protein period is at least 6 days.

239. The method of clause 196, wherein the lower-protein period is at least 7 days.

240. The method of clause 196, wherein the higher-protein period is no more than 14 days.

241. The method of clause 196, wherein the higher-protein period is no more than 10 days.

242. The method of clause 196, wherein the higher-protein period is no more than 7 days.

243. The method of clause 196, wherein the higher-protein period is no more than 6 days.

244. The method of clause 196, wherein the higher-protein period is no more than 5 days.

245. The method of clause 196, wherein the higher-protein period is no more than 4 days.

246. The method of clause 196, wherein the higher-protein period is no more than 3 days.

247. The method of clause 196, wherein the higher-protein period is no more than 2 days.

248. The method of clause 196, further comprising instructing that, during the higher-protein period, the person receives, within a period of 6 hours or less, at least 90 percent of a bodily intake of all protein received in a day.

249. The method of clause 196, further comprising instructing that, during the higher-protein period, the person receives, within a period of 5 hours or less, at least 90 percent of a bodily intake of all protein received in a day.

250. The method of clause 196, further comprising instructing that, during the higher-protein period, the person receives, within a period of 4 hours or less, at least 90 percent of a bodily intake of all protein received in a day.

251. The method of clause 196, further comprising instructing that, during the higher-protein period, the person receives, within a period of 3 hours or less, at least 90 percent of a bodily intake of all protein received in a day.

252. The method of clause 196, further comprising instructing that, during the higher-protein period, the person receives, within a period of 2 hours or less, at least 90 percent of a bodily intake of all protein received in a day.

253. A method of reducing at least one of a likelihood or a severity of disease, comprising:
  (i) to a person selected for having at least one of osteoporosis, osteopenia, or a significant risk of osteoporosis, administering nutrients to the person such that the person's bodily intake of protein is restricted to less than 30 grams per day during a lower-protein period of at least one day;
  (ii) after the lower-protein period, administering nutrients to the person such that the person's bodily intake of protein exceeds 40 grams per day during a higher-protein period; and
  (iii) after the higher-protein period, repeating (i) and (ii).

254. A method of reducing at least one of a likelihood or a severity of disease, comprising:
  (i) to a person selected for having chronic kidney disease, administering nutrients to the person such that the person's bodily intake of protein is restricted to less than 30 grams per day during a lower-protein period of at least one day;
  (ii) after the lower-protein period, administering nutrients to the person such that the person's bodily intake of protein exceeds 40 grams per day during a higher-protein period; and
  (iii) after the higher-protein period, repeating (i) and (ii).

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa. To the extent permitted by law, the contents of this disclosure, including any figures and text, are protected under U.S. copyright law, copyright 2011, 2012.

Autophagy is a homeostatic "self-eating" process that has been conserved among eukaryotic cells and which involves the digestion of cytoplasmic components via the lysosomal pathway. Under normal conditions, it allows cells to break down long-lived proteins, thus complementing the action of the proteasome, which deals chiefly with short-lived proteins. During periods of starvation, stimulation of autophagy is important to provide cells exposed to nutrient deprivation with amino acids, glucose, and fatty acids to maintain metabolism and ATP levels compatible with cell survival.

Stimulation of autophagy plays a critical role in counteracting nutrient deprivation following birth in newborn mice. Under basal conditions, autophagy helps the cell to get rid of damaged organelles, such as mitochondria and toxic aggregation-prone proteins. The functions of autophagy are not limited to these aspects, but extend beyond, as shown by the discovery of its role in the innate and adaptive immune responses. Autophagy malfunction contributes to the pathogenesis of a variety of diseases, including cancer, neurodegenerative and cardiovascular disorders, and infectious diseases. Another important aspect of autophagy in mammalian cells that remains to be unraveled is the role of autophagy in cell death, which has been the topic of several recent reviews.

During autophagy, part of the cytoplasm containing long-lived proteins or organelles is surrounded by a cisternal membrane, designated the phagophore by Seglen. The term "isolation membrane" is also used as a synonym of phagophore. The phagophore then closes to form a double-membraned vacuole, known as the autophagosome. Autophagosomes use dynein motors to move along microtubules towards the microtubule organizing center, where they fuse with lysosomes to form autolysosomes. However, most of the autophagosomes receive input from the endocytic compartments before they fuse with lysosomes.

Many AuTophaGy-related (ATG) genes identified in yeast by genetic screens have mammalian counterparts, and 18 different Atg proteins are known to be recruited to the isolation membrane, where they are involved in autophagosome formation. The origin of the membranes involved in autophagosome formation is unknown, but findings suggest the endoplasmic reticulum (ER) may be the source of lipids in the autophagosomal membranes. Ktistakis and colleagues propose that autophagosomes are formed in a high-phosphatidylinositol 3-phosphate (PtdIns 3P), cup-shaped compartment known as the "omegasome" (from its omega-like shape), which is dynamically connected to the ER. Electron tomography analyses demonstrate a direct connection between the ER and the phagophore.

Evidence supports the idea that autophagy can be regulated at several different physiologic levels: (1) signaling pathways acting upstream of the autophagy machinery; (2) formation of autophagosomes; and (3) maturation of autophagosomes and their fusion with lysosomes.

The existence of these different levels of autophagy regulation means that there are many different ways in which autophagy can be modulated by compounds relevant to clinical interventions. Moreover, the structural biology of Atg proteins is an expanding area of research that should not only reveal the mechanism of action of these proteins, but also guide the design of drugs intended to modulate their activity.

Autophagy refers to the process by which lysosomes degrade intracellular constituents, including both organelles and soluble proteins. This process is traditionally regarded as a cellular response to stress typically related to nutrient deprivation, toxin exposure, infection, or oxidative stress.

In contrast to the ubiquitin-proteasome pathway which degrades mostly short-lived proteins, autophagy is mainly involved in breaking down proteins with long-half lives and damaged organelles. Some basic form of this machinery is highly conserved from yeast to mammals. Depending on how lysosomes receive the cargo, autophagy can be further classified into three types, namely macroautophagy, microautophagy, and chaperone-mediated autophagy (CMA).

Macroautophagy involves multiple steps beginning with induction and ending with the release of the degraded products to the cytosol. It is characterized by the sequestration of cytosolic components in an autophagic vacuole or autophagosome, which fuses with lysosomal membrane to deliver its contents for degradation.

This double-membrane vacuole is the morphological hallmark of autophagy. The process is highly inducible in response to stress signals and regulated at various junctures by a large number of autophagy-related (ATG) genes, which involves controlling the activity of mTOR (mammalian target of rapamycin), a suppressor of macroautophagy. Microautophagy is less well studied than macroautophagy. Unlike macroautophagy, microautophagy does not involve the formation of double-membrane vacuoles.

Rather, the defining feature of microautophagy is the invagination or exvagination of lysosomal membrane to sequester cytosolic components. Mitophagy is a term describing the selective sequestration and removal of mitochondria by either macro- or microautophagy.

Unlike macro- and microautophagy, CMA does not involve membrane vacuoles. Rather, it is regulated by direct protein interaction. Two key regulators, chaperone protein heat-shock cognate 70 (Hsc70) and lysosomal membrane receptor Lamp2A, control the CMA process.

Hsc70, in a complex with other co-chaperone proteins, binds to cytosolic proteins containing a pentapeptide targeting motif KFERQ and delivers substrate proteins to the surface of lysosomes. Binding of this chaperone-substrate complex to Lamp2A leads to the translocation of substrates cross the lysosomal membrane. Both the level and availability of Lamp2A are regulated by stress signals, making Lamp2A one of the major modes by which CMA activity is controlled.

Protein restriction, with or without caloric restriction, can affect disease states and the rate of aging in an organism, such as a human, in a variety of ways including, but not limited to, (a) reducing the rate of production of free radicals (as reactive oxygen species) in mitochondria, leading to reduced oxidation and mutation rates in mitochondrial DNA and RNA; (b) decreasing the degree of membrane fatty acid unsaturation in cells, including in the mitochondrial inner membrane, lowering the susceptibility of membranes to oxidative damage; and (c) increasing autophagy, to repair or replace cellular structures, such as damaged organelles and proteins.

According to aspects of the subject technology, a physician, other health care professional, or subject person can adjust the amount and duration of restriction and/or nonrestriction of protein administered to the person. By following principles of the subject technology as described herein, those of skill in the art can, without difficulty or undue experimentation, to adjust or titrate nutritional parameters, such as daily protein intake and the number of days of protein restriction, to optimize the attainment in the person of such endpoints as disease prevention or amelioration. This is accomplished by, for example, observing the effect of any significant change in a pattern of the person's protein intake over weeks to months. If signs of protein deficiency appear in the person, such as cold intolerance, hypoalbuminemia, or particular changes in skin, hair, and/or nails, an amount of protein administered to the person can easily be increased.

According the subject technology, the degree of consumption or restriction of a person's protein (or other macronutrient) intake may be specified either in absolute or relative terms, such as by, e.g., daily or weekly total intake, or in mass or weight of protein per mass or weight of a person or her fat mass or her lean mass (e.g., mg of protein (or other macronutrient) per kg of the person's bodyweight). All claimed methods, compositions, and systems are intended to encompass any such type of specification. Thus, all methods and systems disclosed as one of the following two options (relative or absolute macronutrient intake) also includes the other:

First exemplary option: (i) during a lower-protein period, the person receives a lower-protein portion such that the person's bodily intake of protein is restricted to less than 0.4 mg/kg of the person's bodyweight per day; and (ii) during a higher-protein period that is after the lower-protein period, the person receives a higher-protein portion such that the person's bodily intake of protein exceeds 0.6 mg/kg of the person's bodyweight per day.

Second exemplary option: (i) administering nutrients to the person such that the person's bodily intake of protein is restricted to less than 40 grams per day during a lower-protein period of at least one day; and (ii) after the lower-protein period, administering nutrients to the person such that the person's bodily intake of protein exceeds 40 grams per day during a higher-protein period.

Some aspects of the subject technology include a method for providing nutrients to a person to maintain or enhance health, comprising: providing nutrient material administrable to at least one of a person's gastrointestinal tract or intravascular space and comprising at least one of lipid or carbohydrate; wherein all of any protein in the material constitutes less than 5 percent of a caloric content of the material; instructing that the material be administered to the person such that the person's bodily intake of at least one of protein, peptides, or amino acids is restricted to less than 30 grams per day during a lower-protein time period of at least 48 hours; instructing that carbohydrate be, or may be, administered to the person such that the person's bodily intake of carbohydrate is at least 40 grams per day during the lower-protein period; and instructing that, during a higher-protein time period that is after the lower-protein period and is at least 24 hours, the person receives a higher bodily intake of protein than the person received during the lower-protein period, such that the average daily bodily intake of all protein during the higher-protein period is at least 40 grams.

In some embodiments, the lower-protein period can be at least 24 hours, at least 36 hours, at least 72 hours, at least 96 hours, at least 120 hours, or similar minimum duration.

The inventor has found that autophagy in at least hepatocytes and neurons is unexpectedly stimulated to a beneficial degree during periods of dietary protein restriction despite a concomitant dietary carbohydrate intake of, e.g., at least 40 grams per day or at least 60 percent of total caloric intake, and despite its attendant elevation of insulin. Elevated insulin has been previously thought to prevent, generally uniformly, autophagy or to prevent substantial increases in autophagy.

In some embodiments, the lower-protein time period is at least 36 hours.

Autophagy and Parkinson's Disease

Emerging evidence supports the view that dysregulation of autophagy may contribute to the pathogenic process in Parkinson's disease (PD). Several genetic risk factors associated with PD have been connected to different forms of autophagy. This includes evidence demonstrating that both macroautophagy and CMA regulate a-synuclein. Furthermore, the CMA process can be disrupted by the a-synuclein A53T mutant. Similarly, it has been shown that the ubiquitin C-terminal hydrolase L1 (UCH-L1) mutant 194M interrupts the CMA process by binding to Lamp2A with abnormally high affinity. Parkin has been shown to be re-localized to mitochondria following mitochondrial damage, which promotes mitophagy.

LRRK2 mutants have been recently found to induce the increase or accumulation of autophagic vacuoles. Loss of PINK1 function has been proposed to affect autophagy.

Strong experimental and epidemiological data exist to support an etiological role for neurotoxins in PD. There are hints that many of these toxins may also alter the process of autophagy. For example, mitochondrial complex I inhibitor rotenone can inhibit capacity of autophagy. 6-OHDA up-regulates LC3 in nigral DA neurons. Paraquat induces the accumulation of autophagic vacuoles.

These toxins may affect CMA. Some studies show that limited exposure to 6-OHDA activates CMA by increasing the levels of Lamp2A.

Intracellular protein misfolding and aggregation are features of many late-onset neurodegenerative diseases called proteinopathies. These include Alzheimer's disease, Parkinson's disease, tauopathies, and polyglutamine expansion diseases [e.g., Huntington's disease and various spinocerebellar ataxias (SCAs), like SCA3]. There are no effective strategies to slow or prevent the neurodegeneration resulting from these diseases in humans. The mutations causing many proteinopathies (e.g., polyglutamine diseases and tauopathies) confer novel toxic functions on the specific protein, and disease severity frequently correlates with the expression levels of the protein. Thus, the factors regulating the synthesis and clearance of these aggregate-prone proteins are putative therapeutic targets. The proteasome and autophagy-lysosomal pathways are the major routes for mutant huntingtin fragment clearance. While the narrow proteasome barrel precludes entry of oligomers and aggregates of mutant huntingtin (or other aggregate-prone intracellular proteins), such substrates can be degraded by macroautophagy.

Rapamycin reduces levels of soluble and aggregated huntingtin and attenuates its toxicity in cells and in transgenic Drosophila and mouse models.

The range of intracellular proteinopathy substrates that are cleared by autophagy includes other targets, including proteins mutated in certain SCAs, forms of synuclein mutated in familial forms of Parkinson's disease, and tau mutants that cause frontotemporal dementia/tauopathy. In this chapter, we consider the therapeutic potential of autophagy upregulation for various proteinopathies, and describe how this strategy may act both by removing the primary toxin (the misfolded/aggregate-prone protein) and by reducing susceptibility to apoptotic insults.

Proteinopathies

Intracellular protein misfolding and aggregation are features of many late-onset neurodegenerative diseases called proteinopathies. These include Alzheimer's disease, Parkinson's disease, tauopathies, and various diseases caused by abnormally expanded tracts of the amino acid glutamine, like Huntington's disease (HD). HD is an autosomal-dominant neurodegenerative disorder caused by a CAG trinucleotide repeat expansion, which results in an abnormally long polyglutamine (polyQ) tract in the N-terminus of huntingtin. Asymptomatic individuals have 35 or fewer CAG repeats, while HD is caused by expansions of 36 or more repeats.

HD belongs to a group of human neurodegenerative disorders caused by CAG repeat/polyQ expansions, which includes spinocerebellar ataxias (SCAs) type 1, 2, 3, 6, 7, and 17, spinobulbar muscular dystrophy (SBMA), and dentatorubral pallidoluysian atrophy (DRPLA).

Autophagy is a bulk degradation process that involves the sequestration of portions of cytoplasm by a double-membrane autophagosome, followed by digestion of the sequestered material when the autophagosome fuses with a lysosome full of hydrolytic enzymes.

Researchers have found that loss of autophagy causes neurodegeneration even in the absence of any disease-associated mutant proteins, which suggests that the continuous clearance of cellular proteins through basal autophagy prevents their accumulation, and in turn prevents neurodegeneration. Experiments in fly and mouse models have provided proof of principle that stimulation of autophagy can prevent and even reverse neurodegenerative disease.

The compound that has been used for such studies, the immunosuppressant rapamycin, stimulates autophagy and aggregate digestion by inhibiting the evolutionarily conserved protein kinase TOR (target of rapamycin). TOR acts as a brake on autophagy; thus, when it is inhibited with rapamycin, autophagy is turned on.

TOR does not control autophagy alone—it is also an activator of ribosome biogenesis and other pathways involved in cell growth. This causes undesired side effects, such as immunosuppression, during long-term administration of rapamycin, and therefore alternative inducers of autophagy are desired.

Dietary restriction of total calories without malnutrition has been shown to prolong life in rats, mice, dogs, fish, spiders, fleas, flies, worms, yeasts, and monkeys.

Dietary protein restriction can achieve many of the same effects as calorie restriction, though protein restriction is generally better tolerated by humans than severe calorie restriction.

One approach to treating and/or preventing any disease according to the subject technology is to restrict protein markedly for a first period, then to resume normal protein feeding during a second period. This accomplishes two goals: (1) stimulating autophagy during the first period, thereby helping clear cells of debris; and (2) preventing protein malnutrition during the second period.

In some embodiments, protein intake may be restricted for up to one day, followed by a period of differing protein intake. The subject technology, however, also includes restricting protein for longer periods, for at least two days, for example, followed by a period of normal to high protein intake. This produces the unexpected result of achieving a more profound degree of autophagy in a subject without producing protein deficiency, protein malnutrition, or protein-calorie malnutrition. This longer duration of autophagy better assists in clearing cells of abnormal proteins (e.g., oxidized, glycated, and fructated proteins) and abnormal organelles, such as mitochondria and lysosomes. This can assist in preventing and treating diseases caused or exacerbated by an accumulation of cellular debris, such as in the heart, pancreas, liver, brain, and skeletal muscles, leading to organ dysfunction.

Protein Restriction and Cancer

Protein restriction can be used according to the subject technology to enhance autophagy and, in some cases, induce cell death, through apoptosis or otherwise, in patients with neoplasms that either benign (e.g., meningioma) or malignant (e.g., astrocytoma). In glioma cells, the drug minocycline induces nonapoptotic cell death, which is associated with the presence of autophagic vacuoles in the cytoplasm. Minocycline induces autophagy, as confirmed by acridine orange, monodansylcadaverine (MDC) stainings of vesicle formation, and the conversion of microtubule-associated proteins light chain 3 (LC3-I) to LC3-II. Pretreatment with autophagy inhibitor 3-methyladenine (3-MA) suppresses induction of acidic vesicular organelles and the accumulation of LC3-II to the autophagosome membrane in glioma cells treated with minocycline. Despite the pretreatment of 3-MA, minocycline induces cell death via apparent activation of caspase-3. Minocycline effectively inhibits tumor growth and induces autophagy in the xenograft tumor model of C6 glioma cells. Thus, minocycline appears to kill glioma cells by inducing autophagic cell death. As a result, stimulation of autophagy by restriction of protein intake according to principles of the subject technology is a promising therapeutic intervention for malignant gliomas and other cancers.

Protein Restriction in Autoimmune Disorders

As used herein, an "autoimmune disorder" is any disorder known or suspected by medical researchers to be related to self-targeting of a mammalian (e.g., human) immune system, such that inflammation results. Each of the following disorders is known or suspected to be autoimmune in nature and can, in certain cases, be treated, prevented, and/or have its severity or progression lessened in a person by restriction of the person's bodily intake of protein according to methods and systems of the subject technology.

| Name of Disorder | Accepted/ Suspected as Autoimmune |
|---|---|
| Acute disseminated encephalomyelitis (ADEM) | Accepted |
| Addison's Disease | |
| Agammaglobulinemia | |
| Alopecia areata | Accepted |
| Amyotrophic Lateral Sclerosis | |
| Ankylosing Spondylitis | Accepted |
| Antiphospholipid syndrome | Accepted |
| Antisynthetase syndrome | |
| Atopic allergy | |
| Atopic dermatitis | |
| Autoimmune aplastic anemia | |
| Autoimmune cardiomyopathy | Accepted |
| Autoimmune enteropathy | |
| Autoimmune hemolytic anemia | Accepted |
| Autoimmune hepatitis | Accepted |
| Autoimmune inner ear disease | Accepted |
| Autoimmune lymphoproliferative syndrome | Accepted |
| Autoimmune peripheral neuropathy | Accepted |
| Autoimmune pancreatitis | Accepted |
| Autoimmune polyendocrine syndrome | Accepted |
| Autoimmune progesterone dermatitis | Accepted |
| Autoimmune thrombocytopenic purpura | Accepted |
| Autoimmune urticaria | Accepted |
| Autoimmune uveitis | Accepted |
| Balo disease/Balo concentric sclerosis | |
| Behçet's disease | |
| Berger's disease | |
| Bickerstaff's encephalitis | |
| Blau syndrome | |
| Bullous pemphigoid | |
| Cancer | |
| Castleman's disease | |
| Celiac disease | Accepted |
| Chagas disease | Suspected |
| Chronic inflammatory demyelinating polyneuropathy | |
| Chronic recurrent multifocal osteomyelitis | |
| Chronic obstructive pulmonary disease | Suspected |
| Churg-Strauss syndrome | |
| Cicatricial pemphigoid | |
| Cogan syndrome | |
| Cold agglutinin disease | Accepted |
| Complement component 2 deficiency | |
| Contact dermatitis | |
| Cranial arteritis | |
| CREST syndrome | |
| Crohns Disease (one of two types of idiopathic inflammatory bowel disease "IBD") | Accepted |
| Cushing's Syndrome | |
| Cutaneous leukocytoclastic angiitis | |
| Dego's disease | |
| Dercum's disease | Suspected |
| Dermatitis herpetiformis | |
| Dermatomyositis | Accepted |
| Diabetes mellitus type 1 | Accepted |
| Diffuse cutaneous systemic sclerosis | |
| Dressler's syndrome | |
| Drug-induced lupus | |
| Discoid lupus erythematosus | |
| Eczema | |
| Endometriosis | Suspected |
| Enthesitis-related arthritis | |
| Eosinophilic fasciitis | Accepted |
| Eosinophilic gastroenteritis | |
| Epidermolysis bullosa acquisita | |
| Erythema nodosum | |
| Erthroblastosis fetalis | |
| Essential mixed cryoglobulinemia | |
| Evan's syndrome | |
| Fibrodysplasia ossificans progressiva | |
| Fibrosing aveolitis aka Idiopathic_pulmonary_fibrosis | |
| Gastritis | |
| Gastrointestinal pemphigoid | Accepted |
| Giant cell arteritis | |
| Glomerulonephritis | Sometimes |
| Goodpasture's syndrome | Accepted |
| Graves' disease | Accepted |
| Guillain-Barré syndrome (GBS) | Accepted |

| Name of Disorder | Accepted/ Suspected as Autoimmune |
|---|---|
| Hashimoto's encephalopathy | Accepted |
| Hashimoto's thyroiditis | Accepted |
| Henoch-Schonlein purpura | |
| Herpes gestationis aka Gestational Pemphigoid | |
| Hidradenitis suppurativa | Suspected |
| Hypogammaglobulinemia | |
| Idiopathic Inflammatory Demyelinating Diseases | |
| Idiopathic pulmonary fibrosis | |
| Idiopathic thrombocytopenic purpura (SeeAutoimmune thrombocytopenic purpura) | Accepted |
| IgA nephropathy | |
| Inclusion body myositis | |
| Chronic inflammatory demyelinating polyneuropathy | |
| Interstitial cystitis | Suspected |
| Juvenile idiopathic arthritis aka Juvenile rheumatoid arthritis | |
| Kawasaki's Disease | Suspected |
| Lambert-Eaton myasthenic syndrome | |
| Leukocytoclastic vasculitis | |
| Lichen planus | |
| Lichen sclerosus | |
| Linear IgA disease (LAD) | |
| Lou Gehrig's disease (Also Amyotrophic lateral sclerosis) | |
| Lupoid hepatitis aka Autoimmune hepatitis | |
| Lupus erythematosus | Accepted |
| Majeed syndrome | |
| Ménière's disease | |
| Microscopic polyangiitis | |
| Miller-Fisher syndrome see Guillain-Barre_Syndrome | Accepted |
| Mixed Connective Tissue Disease | Accepted |
| Morphea | Suspected |
| Mucha-Habermann disease aka Pityriasis lichenoides et varioliformis acuta | |
| Multiple sclerosis | Suspected |
| Myasthenia gravis | Accepted |
| Myositis | |
| Narcolepsy | Suspected |
| Neuromyelitis optica (Also Devic's Disease) | |
| Neuromyotonia | Suspected |
| Occular cicatricial pemphigoid | |
| Opsoclonus myoclonus syndrome | Suspected |
| Ord's thyroiditis | |
| Palindromic rheumatism | |
| PANDAS (pediatric autoimmune neuropsychiatric disorders associated with streptococcus) | Suspected |
| Paraneoplastic cerebellar degeneration | |
| Paroxysmal nocturnal hemoglobinuria (PNH) | Sometimes |
| Parry Romberg syndrome | |
| Parsonnage-Turner syndrome | |
| Pars planitis | |
| Pemphigus vulgaris | Accepted |
| Pernicious anaemia | Accepted |
| Perivenous encephalomyelitis | |
| POEMS syndrome | |
| Polyarteritis nodosa | |
| Polymyalgia rheumatica | |
| Polymyositis | Accepted |
| Primary biliary cirrhosis | Accepted |
| Primary sclerosing cholangitis | |
| Progressive inflammatory neuropathy | Suspected |
| Psoriasis | Accepted |
| Psoriatic arthritis | Accepted |
| Pyoderma gangrenosum | |
| Pure red cell aplasia | |
| Rasmussen's encephalitis | |
| Raynaud phenomenon | Suspected |
| Relapsing polychondritis | Accepted |
| Reiter's syndrome | |
| Restless leg syndrome | Suspected |
| Retroperitoneal fibrosis | |
| Rheumatoid arthritis | Accepted |
| Rheumatic_fever | |

-continued

| Name of Disorder | Accepted/Suspected as Autoimmune |
|---|---|
| Sarcoidosis | Suspected |
| Schizophrenia | Suspected |
| Schmidt syndrome another form of APS | |
| Schnitzler syndrome | |
| Scleritis | |
| Scleroderma | Suspected |
| Serum Sickness | |
| Sjören's syndrome | Accepted |
| Spondyloarthropathy | |
| Still's disease see Juvenile Rheumatoid Arthritis | |
| Stiff person syndrome | Suspected |
| Subacute bacterial endocarditis (SBE) | |
| Susac's syndrome | |
| Sweet's syndrome | |
| Sydenham chorea (see PANDAS) | |
| Sympathetic ophthalmia | |
| Systemic lupus erythematosis see Lupus erythematosis | |
| Takayasu's arteritis | |
| Temporal arteritis (also known as "giant cell arteritis") | Accepted |
| Thrombocytopenia | |
| Tolosa-Hunt syndrome | |
| Transverse myelitis | Accepted |
| Ulcerative colitis (one of two types of idiopathic inflammatory bowel disease "IBD") | Accepted |
| Undifferentiated connective tissue disease different from Mixed connective tissue disease | Accepted |
| Urticarial vasculitis | |
| Vasculitis | Accepted |
| Vitiligo | Suspected |
| Wegener's granulomatosis | Accepted |

According to embodiments of the subject technology, by restricting protein intake in persons who have or are at risk for autoimmune disorders, one can decrease cellular damage, decrease the susceptibility of cells to damage, and, at least by increasing autophagy, increase cleanup of the damage in some cases.

Protein restriction in sequelae of obesity, hypertension, insulin resistance, and metabolic syndrome In both genetic and dietary models of obesity, one can observe a marked downregulation of autophagy, particularly in Atg7 expression levels in liver. Suppression of Atg7 both in vitro and in vivo results in defective insulin signaling and elevated endoplasmic reticulum (ER) stress. In contrast, restoration of Atg7 expression in liver results in dampened ER stress, enhanced hepatic insulin action, and systemic glucose tolerance in obese mice. Beneficial Atg7 restoration in obese mice can be prevented by blocking a downstream autophagy mediator, Atg5, supporting the concept of Atg7's dependence on autophagy for regulating insulin action. Thus, autophagy is an important regulator of organelle function and insulin signaling, and loss of autophagy contributes strongly to the defective insulin action of obesity, which in turn leads to many known sequelae and is associated with, for example, hypertension, hyperlipidemia, hypercholesterolemia, hypertriglyceridemia, certain cancers, cholelithiasis, depression, coronary artery disease, peripheral vascular disease, type 2 diabetes, Alzheimer's disease, and other dementia syndromes.

Protein Restriction in Diabetes Mellitus

Type 2 diabetes mellitus is characterized by insulin resistance and failure of pancreatic beta cells producing insulin. Mitochondrial dysfunction plays a role in both processes of diabetes. Autophagy, which can be upregulated by restriction of dietary energy and/or protein, maintains cellular homeostasis through degradation and recycling of organelles such as mitochondria. As dysfunctional mitochondria are the main organelles removed by autophagy, one can observe the role of autophagy in diabetes using mice with beta cell-specific deletion of, for example, the Atg7 gene. Atg7-mutant mice show reduction in beta cell mass and pancreatic insulin content. Electron microscopy shows swollen mitochondria and other ultrastructural changes in autophagy-deficient beta cells. Insulin secretory function ex vivo is also impaired. As a result, Atg7-mutant mice show hypoinsulinemia and hyperglycemia. Autophagy appears necessary to maintain structure, mass, and function of beta cells. Besides its effect on beta cells, autophagy affects insulin sensitivity because mitochondrial dysfunction is implicated in insulin resistance and autophagy is involved in the maintenance of organelles, including mitochondria. Furthermore, since aging is associated with impaired glucose tolerance, decline of autophagic activity appears to be involved in age-associated reduction of glucose tolerance.

Protein Restriction in Infection

Autophagy acts an immune mechanism. One of the model systems showing how autophagy and more traditional immunity systems cooperate in defense against intracellular pathogens is macrophage infection with *Mycobacterium tuberculosis*. *M. tuberculosis* is a significant human pathogen that latently infects billions of people and causes active disease in millions of patients worldwide. The ability of the tubercle bacillus to persist in human populations rests upon its macrophage parasitism. Autophagy can act as a cell-autonomous innate immunity mechanism capable of eliminating intracellular bacteria, e.g., *M. tuberculosis*. Embodiments of the subject technology recognize that: (1) autophagy functions as an innate defense mechanism against intracellular microbes; (2) autophagy is under the control of pattern recognition receptors (PRR) such as Toll-like receptors (TLR), and it acts as an immunological output effector of PRR and TLR signaling; (3) autophagy is one of the effector functions associated with the immunity-regulated GTPases, which are molecules involved in cell-autonomous defense; (4) autophagy is an immune effector of Th1/Th2 T cell response polarization—autophagy is activated by Th1 cytokines (acting in defense against intracellular pathogens) and is inhibited by Th2 cytokines (making cells accessible to intracellular pathogens). As an ancient innate immunity defense, autophagy became integrated over the course of evolution with other immune mechanisms of increasing complexity.

Protein Restriction and Macular Degeneration

Age-related macular degeneration (AMD) is the major cause of blindness in the elderly, over 1.75 million people having reduced vision due to AMD in the United States. AMD is broadly divided into two forms, dry and wet, that account for about 85% and 15% of cases, respectively. An early sign of AMD is the appearance of drusen, which are extracellular deposits that accumulate on Bruch's membrane, and are thought to derive from the overlying retinal pigment epithelium (RPE). Scientists have proposed that increased autophagy and the release of intracellular proteins via exosomes by the aged RPE may contribute to the formation of drusen. Furthermore, a decline in autophagic efficiency in the RPE is associated with the later pathological stages of AMD and cellular dysfunction.

Protein Restriction in Osteoporosis

Osteoporosis, osteopenia, and other disorders of bone density and/or mineralization can, in certain cases, be treated, prevented, and/or have its severity or progression lessened in a person by episodic restriction of the person's bodily intake of protein according to methods and systems of the subject technology.

Protein Restriction in Chronic Kidney Disease

Chronic kidney disease can, in certain cases, be treated, prevented, and/or have its severity or progression lessened in a person by episodic restriction of the person's bodily intake of protein according to methods and systems of the subject technology.

Protein Restriction and Male Pattern Baldness

Male pattern baldness, or alopecia androgenica, is marked typically by higher levels of 5-alpha-reductase, lower levels of total testosterone, higher levels of unbound/free testosterone, and higher levels of total free androgens including DHT. 5-alpha-reductase is responsible for converting free testosterone into DHT. The enzymes are present predominantly in the scalp and prostate. Levels of 5-alpha-reductase are one factor in determining levels of DHT in the scalp. Drugs which interfere with 5-alpha-reductase (such as finasteride, which inhibits the predominant type 2 isoform) have been approved by the FDA as treatments for hair loss.

Sex hormone-binding globulin (SHBG), which is responsible for binding testosterone and preventing its bioavailability and conversion to DHT, is typically lower in individuals with high DHT. SHBG is downregulated by insulin.

Increased levels of Insulin Growth Factor-1 (IGF-1) have been correlated to vertex balding, and IGF-1 may be lowered by protein restriction. High insulin levels seem a possible link between metabolic syndrome and baldness. Low levels of SHBG in men and non-pregnant women are also correlated with glucose intolerance and diabetes risk, though this correlation disappears during pregnancy.

By increasing autophagy by protein restriction, destruction of hair follicles and consequent hair loss can in some cases be delayed or possibly avoided.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

As used herein, "a period of at least" a particular time (e.g., "a period of at least one day") refers to time period having of a duration of at least as long as that time (e.g., a period lasting one day or more in duration).

As used herein, a phrase such as "instructing that the material be administered to X" (e.g., a person) can refer either to self-administration by X, or to administration to X by another person or agent, such as a health care worker or a machine, such as a robot.

As used herein, the terms "all protein" and "all of any protein" have at least their ordinary meaning and are further defined to include all proteins, peptides, polypeptides, and amino acids, free or otherwise, in a particular material, food, meal, other circumstance, or time period of consumption, ingestion, or administration.

As used herein, "meal" is a broad term that encompasses its ordinary meaning and can refer to a food and/or drink (or beverage) portion of any size, such as a snack or food "treat," whether frozen, chilled, hot, cookable, microwaveable, reheatable, or raw. Such a meal may be ingested enterally, such as orally or by gastrostomy.

Any of the methods or systems of periodic or episodic protein restriction described herein may be used, as will be evident to one skilled in the art, for any of the diseases and conditions listed in this description of the subject technology. The amounts and timing of macronutrient administration may be altered or titrated according to patient response.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" can include, but does not require, selection of at least one of each item in the series. Rather, the phrase allows a meaning that includes at least one of any one of the items, and/or at least one of any combination of the items, and/or at least one of each of the items. By way of example, the phrase "at least one of A, B, and C" includes at least one of only A, of only B, of only C, of any combination of A, B, and C; and/or of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method for providing nutrients to a subject with cognitive impairment, comprising:
   (a) administering nutrient material to a subject having cognitive impairment such that the subject has no bodily intake of protein during a low-protein time period of at least 7 consecutive days;
   wherein the nutrient material is administrable to at least one of the subject's gastrointestinal tract or intravascular space and comprises carbohydrate;
   (b) administering nutrition to the subject such that the subject's bodily intake of carbohydrate constitutes at least 40 percent of the subject's bodily intake of energy during the low-protein period;
   wherein, during a first high-protein time period that is immediately after the low-protein period and is at least 7 consecutive days, the subject receives a daily bodily intake of protein of at least 40 grams; and
   immediately after the first high-protein period, repeating (a) and (b);
   wherein, during a second high-protein time period lasting at least 7 consecutive days and that is immediately after the repeating (a) and (b), the subject receives a daily bodily intake of protein of at least 40 grams.

2. The method of claim 1, wherein the person's bodily intake of carbohydrate constitutes at least 60 percent of the person's bodily intake of calories during the low-protein period.

3. The method of claim 1, wherein the person's bodily intake of carbohydrate constitutes at least 80 percent of the person's bodily intake of calories during low-protein period.

4. The method of claim 1, wherein the person's bodily intake of carbohydrate is at least 100 grams per day during the low-protein period.

5. The method of claim 1, wherein carbohydrate in the material constitutes at least 50 percent of the caloric content of the material.

6. The method of claim 1, wherein carbohydrate in the material constitutes at least 90 percent of the caloric content of the material.

7. The method of claim 1, wherein the administering the material comprises providing individually packaged servings of the material.

8. The method of claim 1, wherein, during the first high-protein period, the person receives a bodily intake of all protein of at least 100 grams.

9. The method of claim 1, wherein, during the first high-protein period, the person receives a bodily intake of all protein of at least 0.6 g per kilogram of the person's body weight.

10. The method of claim 1, wherein, during the first high-protein period, the subject receives a bodily intake of all protein of at least 0.8 g per kilogram of the subject's body weight.

11. The method of claim 1, wherein the first high-protein period is no more than 14 consecutive days.

12. The method of claim 1, wherein, during the first high-protein period, the subject receives, within a period of 4 hours or less, at least 90 percent of a bodily intake of all protein received in a day.

13. The method of claim 1, wherein the subject has at least one of Alzheimer's disease, Parkinson's disease, multiple sclerosis, overweight, obesity, hypertension, metabolic syndrome, type 1 diabetes, type 2 diabetes, hyperinsulinemia, glucose intolerance, insulin resistance, diabetes, a bacterial infection, a viral infection, a fungal infection, a prion infection, macular degeneration, glaucoma, male pattern baldness, a precancerous lesion, an inflammatory bowel disease, Crohn's disease, ulcerative colitis, a cardiac dysrhythmia, or an autoimmune disorder.

14. The method of claim 1, wherein the subject has Alzheimer's disease.

15. The method of claim 1, wherein the subject has at least one of Alzheimer's disease, Parkinson's disease, a tauopathy, a polyglutamine expansion disease, Huntington's disease, or a spinocerebellar ataxia.

16. The method of claim 1, wherein the subject is not calorie restricted.

17. The method of claim 1, wherein the subject is not calorie restricted, and the first high-protein period is no more than 14 consecutive days.

* * * * *